US011270408B2

(12) United States Patent
Xu et al.

(10) Patent No.: US 11,270,408 B2
(45) Date of Patent: Mar. 8, 2022

(54) METHOD AND APPARATUS FOR GENERATING SPECIAL DEFORMATION EFFECT PROGRAM FILE PACKAGE, AND METHOD AND APPARATUS FOR GENERATING SPECIAL DEFORMATION EFFECTS

(71) Applicant: Beijing SenseTime Technology Development Co., Ltd., Beijing (CN)

(72) Inventors: Qinqin Xu, Beijing (CN); Dayu Yue, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/914,654

(22) Filed: Jun. 29, 2020

(65) Prior Publication Data
US 2020/0327641 A1    Oct. 15, 2020

Related U.S. Application Data

(63) Continuation of application No. PCT/CN2019/074498, filed on Feb. 1, 2019.

(30) Foreign Application Priority Data

Feb. 7, 2018    (CN) .......................... 201810123074.2

(51) Int. Cl.
*G06T 3/00* (2006.01)
*G06F 3/04847* (2022.01)

(52) U.S. Cl.
CPC ........ *G06T 3/0093* (2013.01); *G06F 3/04847* (2013.01); *G06T 2200/24* (2013.01)

(58) Field of Classification Search
CPC .......................... G06T 3/0093; G06F 3/04847
See application file for complete search history.

(56) References Cited

U.S. PATENT DOCUMENTS 5,990,901 A * 11/1999 Lawton ................. G06T 15/503
                                                          345/581
9,007,473 B1     4/2015 Worley, III
(Continued)

FOREIGN PATENT DOCUMENTS

CN        102055912 A        5/2011
CN        102567031 A        7/2012
(Continued)

OTHER PUBLICATIONS

International Search Report in the international application No. PCT/CN2019/074498, dated Apr. 30, 2019, 2 pgs.
(Continued)

*Primary Examiner* — Phi Hoang
(74) *Attorney, Agent, or Firm* — Cooper Legal Group, LLC

(57) ABSTRACT

A method and apparatus for generating a special deformation effect program file package and a computer readable storage medium are provided. The method includes: acquiring parameter values of deformation effect parameters of at least one deformation region; establishing a correlation between the at least one deformation region and at least one predetermined key point; and according to the at least one deformation region, the parameter values of which have been acquired, and the correlation, generating a special deformation effect program file package.

24 Claims, 9 Drawing Sheets

(56) References Cited

U.S. PATENT DOCUMENTS

| | | | | |
|---|---|---|---|---|
| 9,838,641 | B1* | 12/2017 | Lim | H04N 5/23241 |
| 2001/0037191 | A1* | 11/2001 | Furuta | G06T 7/596 |
| | | | | 703/6 |
| 2007/0153091 | A1* | 7/2007 | Watlington | H04N 21/233 |
| | | | | 348/208.14 |
| 2010/0189357 | A1* | 7/2010 | Robin | G06T 11/001 |
| | | | | 382/195 |
| 2012/0251070 | A1* | 10/2012 | Curcio | G11B 27/28 |
| | | | | 386/230 |
| 2013/0230259 | A1* | 9/2013 | Intwala | G06T 11/00 |
| | | | | 382/255 |
| 2014/0196152 | A1* | 7/2014 | Ur | G06F 21/00 |
| | | | | 726/26 |
| 2018/0108165 | A1 | 4/2018 | Shi et al. | |
| 2018/0137382 | A1* | 5/2018 | Nowak | G06F 16/90335 |
| 2020/0327641 | A1 | 10/2020 | Xu | |

FOREIGN PATENT DOCUMENTS

| | | |
|---|---|---|
| CN | 103810739 A | 5/2014 |
| CN | 105451090 A | 3/2016 |
| CN | 105868769 A | 8/2016 |
| CN | 105975935 A | 9/2016 |
| CN | 106302124 A | 1/2017 |
| CN | 107343211 A | 11/2017 |
| CN | 108280883 A | 7/2018 |
| JP | H0844896 A | 2/1996 |
| JP | H11306372 A | 11/1999 |
| JP | 2003263641 A | 9/2003 |
| JP | 2011053942 A | 3/2011 |
| JP | 2016057775 A | 4/2016 |
| JP | 2017220039 A | 12/2017 |
| WO | 2017073001 A1 | 5/2017 |

OTHER PUBLICATIONS

English translation of the Written Opinion of the International Search Authority in the international application No. PCT/CN2019/074498, dated Apr. 30, 2019, 7 pgs.

First Office Action of the Chinese application No. 201810123074.2, dated Nov. 26, 2019, 40 pgs.

Second Office Action of the Chinese application No. 201810123074.2, dated May 25, 2020, 59 pgs.

First Office Action of the Singaporean application No. 11202006343R, dated Jul. 13, 2021, 7 pgs.

First Office Action of the Japanese application No. 2020-536147, dated Aug. 24, 2021, 17 pgs.

* cited by examiner

METHOD AND APPARATUS FOR GENERATING SPECIAL DEFORMATION EFFECT PROGRAM FILE PACKAGE, AND METHOD AND APPARATUS FOR GENERATING SPECIAL DEFORMATION EFFECTS

CROSS REFERENCE TO RELATED APPLICATIONS

The present application is a continuation of International Patent Application No. PCT/CN2019/074498, filed on Feb. 1, 2019, which claims priority to Chinese Patent Application No. 201810123074.2, filed on Feb. 7, 2018. The disclosures of International Patent Application No. PCT/CN2019/074498 and Chinese Patent Application No. 201810123074.2 are hereby incorporated by reference in their entireties.

BACKGROUND

Augmented Reality (AR) is a new technology that "seamlessly" integrates real-world information with virtual-world information. The AR simulates solid information originally in a given time and space range in the real world, and then superimposes virtual information, such that the virtual information is applied to the real world, and persons and environments in the real world and virtual objects are instantly superimposed to a same scene or space to achieve sensory experience that is beyond the reality.

SUMMARY

The present application relates to computer vision technologies, and in particular, to a method and apparatus for generating a deformation special effect program file package and a method and apparatus for generating a deformation special effect.

According to one aspect of the embodiments of the present disclosure, provided is a method for generating a deformation special effect program file package, including: obtaining parameter values of at least one deformation effect parameter for at least one deformation region; establishing a correspondence between the at least one deformation region and predetermined at least one key point; and generating a deformation special effect program file package according to the correspondence and the at least one deformation region for which the parameter values are obtained.

According to another aspect of the embodiments of the present disclosure, provided is a method for generating a deformation special effect, further including: obtaining a parameter value of a deformation effect parameter for a deformation region; and generating a special effect of a deformation effect on an image to be processed based on at least one key point in the image to be processed and the parameter value of the deformation effect parameter for the deformation region.

According to still another aspect of the present disclosure, provided is an apparatus for generating a deformation special effect program file package, including: a first obtaining module, configured to obtain parameter values of at least one deformation effect parameter for at least one deformation region; an establishing module, configured to establish a correspondence between the at least one deformation region and predetermined at least one key point; and a first generating module, configured to generate a deformation special effect program file package according to the correspondence and the at least one deformation region for which the parameter values are obtained.

According to still another aspect of the embodiments of the present disclosure, provided is an apparatus for generating a deformation special effect, including: a second obtaining module, configured to obtain a parameter value of a deformation effect parameter for a deformation region; a second generating module, configured to generate a special effect of a deformation effect on an image to be processed on the basis of at least one key point in the image to be processed and the parameter value of the deformation effect parameter of the deformation region.

According to yet another aspect of the embodiments of the present disclosure, provided is an electronic device, including: a memory, configured to store a computer program; and a processor, configured to execute the computer program stored in the memory, where when the computer program, when being executed by a processor, enables the processor to implement the method according to any one of the embodiments of the present disclosure.

According to yet another aspect of the embodiments of the present disclosure, provided is a computer readable storage medium having a computer program stored thereon, where the computer program, when being executed by a processor, enables the processor to implement the method according to any one of the embodiments of the present disclosure.

According to yet another aspect of the embodiments of the present disclosure, provided is a computer program, including computer instructions, where the computer instructions, when running in a processor of a device, enables the processor to implement the method according to any one of the embodiments of the present disclosure.

The technical solutions of the present disclosure are further described in detail with reference to the accompanying drawings and embodiments as follows.

BRIEF DESCRIPTION OF THE DRAWINGS

The accompanying drawings constituting a part of the specification describe embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
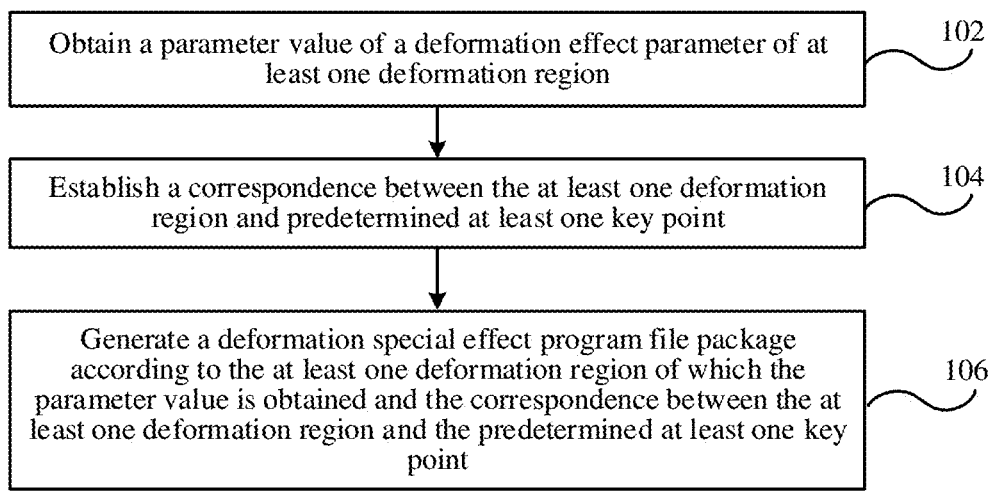
FIG. 1 is a flowchart of one embodiment of a method for generating a deformation special effect program file package of the present disclosure.

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

It should also be understood that in the embodiments of the present disclosure, "a plurality of" may refer to two or more, and "at least one" may refer to one, two, or more.

A person skilled in the art may understand that the terms such as "first" and "second" in the embodiments of the present disclosure are only used to distinguish different steps, devices or modules, etc., and do not represent any specific technical meaning or an inevitable logical sequence therebetween.

It should also be understood that any component, data, or structure mentioned in the embodiments of the present disclosure should be generally understood as one or more under the condition that no explicit definition is provided or no opposite motivation is provided in the context.

It should also be understood that, the descriptions of the embodiments in the present disclosure focus on differences between the embodiments, and for same or similar parts in the embodiments, refer to these embodiments. For the purpose of brevity, details are not described again.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

In addition, the term "and/or" in the present disclosure describes only an association relationship between associated objects and represents that three relationships may exist. For example, A and/or B may represent the following three cases: only A exists, both A and B exist, and only B exists. In addition, the character "I" in the present disclosure generally represents that the preceding and latter associated objects are in an "or" relation.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the systems, and the like.

The electronic devices such as terminal devices, computer systems, and servers may be described in the general context of computer system executable instructions (such as, program modules) executed by the computer systems. Generally, the program modules may include routines, programs, target programs, components, logics, data structures, and the like for performing specific tasks or implementing specific abstract data types. The computer systems/servers may be practiced in the distributed cloud computing environments in which tasks are performed by remote processing devices that are linked through a communications network. In the distributed computing environments, the program modules may be located in local or remote computing system storage mediums including storage devices.

FIG. 1 is a flowchart of one embodiment of a method for generating a deformation special effect program file package of the present disclosure. The method for generating a deformation special effect program file package according to the embodiments of the present disclosure, for example, may be implemented by, but not limited to, a deformation apparatus (called an apparatus for generating a deformation special effect program file package in the embodiments of the present disclosure). As shown in FIG. 1, the method for generating a deformation special effect program file package of the embodiments includes the following steps.

At 102, a parameter value of a deformation effect parameter of at least one deformation region is obtained.

In an optional example, the operation 102 may be performed by a processor by invoking a corresponding instruction stored in a memory, and may also be performed by a first obtaining module run by the processor.

At 104, a correspondence between the at least one deformation region and predetermined at least one key point is established.

In an optional example, the operation 104 may be executed by a processor by invoking a corresponding instruction stored in a memory, and may also be executed by an establishing module run by the processor.

At 106, a deformation special effect program file package is generated according to the at least one deformation region of which the parameter value is obtained and the correspondence between the at least one deformation region and the predetermined at least one key point.

In an optional example, the operation 106 may be performed by a processor by invoking a corresponding instruction stored in a memory, and may also be performed by a first generating module run by the processor.

In the embodiments of the present disclosure, the shape of the deformation region is not limited, and may be, for example, a circle, an ellipse, a rectangle, a square, a triangle, or any other shape.

In the embodiments of the present disclosure, there may be one or more deformation regions. If there are a plurality of deformation regions, operations 102-104 may be performed for the deformation regions respectively. That is, parameter values of deformation effect parameters of the deformation regions are respectively obtained, the correspondence between the deformation regions and predetermined at least one key point is established, and then operation 106 is performed on the plurality of deformation regions, i.e., a deformation special effect program file package is generated according to the parameter values of the deformation effect parameters of the plurality of the deformation regions and the correspondence.

In the embodiments of the present disclosure, the deformation special effect program file package may be used for performing deformation special effect processing on an image to generate a deformation effect (also called deformation special effect) of the deformation region on the image, for example, performing AR effect rendering processing on a video image.

On the basis of the method for generating a deformation special effect program file package provided by the embodiments of the present disclosure, the parameter value of the deformation effect parameter of at least one deformation region is obtained, a correspondence between the at least one deformation region and predetermined at least one key point is established, and the deformation special effect program file package is generated according to the at least one deformation region of which the parameter value is obtained and the correspondence, such that a deformation effect is added to an image on the basis of the deformation special effect program file package to implement a deformation special effect of the image. The embodiments of the present disclosure can generate a rendering engine executable deformation special effect program file without manually writing a program file, feature simple operations and a short required time, improve the overall efficiency of the implementation of a deformation special effect, and effectively ensure the accuracy of the deformation special effect.

In another embodiment of the method for generating a deformation special effect program file package of the present disclosure, before the operation 102, i.e., obtaining the parameter value of the deformation effect parameter of the at least one deformation region, the method may further include: adding the at least one deformation region.

Figure 2:
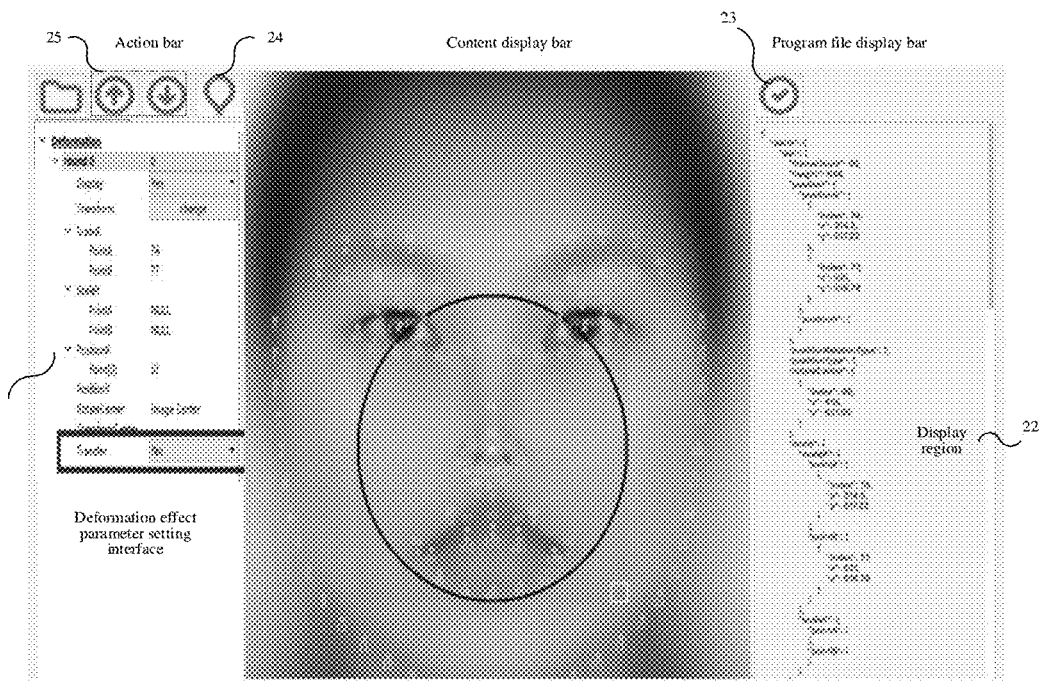
FIG. 2 is a schematic diagram of an operation interface of an apparatus for generating a deformation special effect program file package according to the embodiments of the present disclosure.

In one implementation of the embodiments of the method for generating a deformation special effect program file package of the present disclosure, if there are a plurality of deformation regions, the operation 102 may include: performing batch obtaining of parameter values of the deformation effect parameters of the plurality of deformation regions; and/or respectively obtaining parameter values of the deformation effect parameters of at least some of the plurality of deformation regions; and/or obtaining another deformation region and a parameter value of the deformation effect parameter of the another deformation region by duplicating one deformation region In one implementation of the embodiments of the present disclosure, the apparatus for generating a deformation special effect program file package may include a preset special effect program file which may be, for example, a JavaScript language-based lightweight data-interchange format file, i.e., a JavaScript Object Notation (JSON) file, or any other executable program file. The parameter value of the deformation effect parameter in the special effect program file may be vacant or preset as a default value. When a parameter value set for the deformation effect parameter of the deformation region is received, the corresponding parameter value in the special effect program file is automatically updated as the received parameter value. Optionally, the apparatus for generating a deformation special effect program file package may include an operation interface. The operation interface includes an action bar. The action bar is provided with at least one interactive interface configured to receive the parameter value set for the deformation effect of the deformation region. In addition, the operation interface of the apparatus for generating a deformation special effect program file package may further include a program file display bar configured to display a program file of the deformation effect of the deformation region. FIG. 2 is a schematic diagram of an operation interface of the apparatus for generating a deformation special effect program file package according to the embodiments of the present disclosure. In the operation interface, "deformation" represents the deformation special effect or deformation effect. After being started, the apparatus for generating a special effect program file package corresponds to a deformation effect parameter setting interface of a deformation region in the action bar. The program file display bar displays a special effect program file in which the deformation effect parameter of the deformation region is vacant or preset as a default value. When a parameter value for the deformation effect parameter setting of the deformation region is received through the interactive interface of the action bar, the parameter value of the deformation effect parameter of the deformation region is updated as the most recently received parameter value, and the program file display bar instantly displays the special effect program file in which the parameter value has been updated.

The embodiments of the present disclosure can generate a rendering engine executable file without manually writing a program file, can implement the generation of a deformation special effect program file package on the basis of setting operations of a user on the parameter value of the deformation effect parameter of the deformation region in the action bar, feature simple operations and a short required time, improve the overall efficiency of the implementation of a deformation special effect, and effectively ensure the accuracy of the deformation effect.

Figure 3:
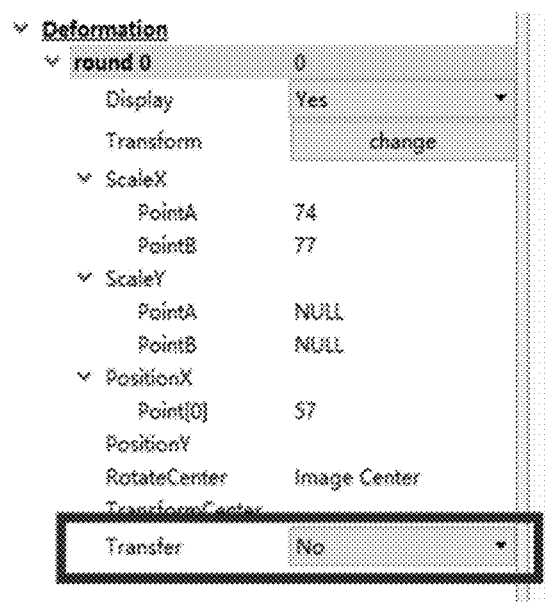
FIG. 3 is an exemplary schematic diagram of a deformation effect parameter setting interface of a deformation region according to the embodiments of the present disclosure.

As shown in FIG. 2, as an optional example, and not limitation, of the embodiments of the present disclosure, the action bar may include a deformation effect parameter setting interface including at least one interactive interface. In addition, other regions, for example, a name display region of the deformation region, may further be included. In this case, the deformation effect parameter setting interface may be the deformation effect parameter setting interface of the deformation regions. FIG. 3 is an exemplary schematic diagram of a deformation effect parameter setting interface of a deformation region named "round0" according to the embodiments of the present disclosure.

In another embodiment of the method for generating a deformation special effect program file package of the present disclosure, before the operation 102, i.e., obtaining the parameter value of the deformation effect parameter of the at least one deformation region, the method may further include: receiving a deformation region adding instruction input through an interactive interface of an action bar, adding the at least one deformation region, generating a deformation effect parameter setting interface of the at least one deformation region, and displaying the deformation effect parameter setting interface of the at least one deformation region under the action bar. For example, one or more deformation regions may be added by clicking on a control button, such as the deformation special effect button, i.e., "deformation", in the action bar. Correspondingly, in the embodiments, obtaining a parameter value of a deformation effect parameter of at least one deformation region in the operation 102 may include: obtaining the parameter value of the deformation effect parameter of the at least one deformation region through the deformation effect parameter setting interface.

In addition, in still another embodiment of the method for generating a deformation special effect program file package of the present disclosure, obtaining a parameter value of a deformation effect parameter of at least one deformation region in the operation 102 may include: obtaining a position parameter of the deformation region by moving the deformation region on a reference image; and/or obtaining a range of the deformation region by adjusting the size of the deformation region; and/or obtaining a parameter value of the deformation effect parameter of the deformation region by adjusting a deformation curve for controlling a deformation effect; and/or obtaining a parameter value of the deformation effect parameter of the deformation region by receiving a parameter value of a deformation effect control parameter.

In an optional example, obtaining a parameter value of a deformation effect parameter of at least one deformation region may be implemented by the following mode: in response to receiving a parameter value of a deformation effect parameter sent through an interactive interface in the deformation effect parameter setting interface of the deformation region, taking a set parameter value as the parameter value of the deformation effect parameter of the deformation region; and/or in response to not receiving a parameter value of a deformation effect parameter sent through an interactive interface in the deformation effect parameter setting interface of the deformation region, taking a preset parameter value as the parameter value of the deformation effect parameter of the deformation region.

In addition, in still another embodiment of the method for generating a deformation special effect program file package of the present disclosure, the method may further include: receiving a deformation region deletion instruction input through the interactive interface of the action bar, and deleting the deformation region indicated by the deformation region deletion instruction and the parameter value of the deformation effect parameter of the deformation region.

In one implementation of the embodiments of the present disclosure, the key point, for example, may include, but not limited to, at least one of a head key point, a face key point, a shoulder key point, an arm key point, a gesture key point, a waist key point, a leg key point, a foot key point, a human skeleton key point, etc.

In an optional example, the head key point, for example, may include, but not limited to, at least one of a head top key point, a nose tip key point, a chin key point, etc.

In an optional example, the face key point, for example, may include, but not limited to, at least one of a face contour key point, an eye key point, an eyebrow key point, a nose key point, a mouth key point, etc.

Exemplarily, the eye key point, for example, may include, but not limited to, at least one of a left eye contour key point, a left eye pupil center key point, a left eye center key point, a right eye contour key point, a right eye pupil center key point, a right eye center key point, etc. The eyebrow key point, for example, may include, but not limited to, at least one of a left eyebrow key point, a right eyebrow key point, etc. The nose key point, for example, may include, but not limited to, at least one of a nose bridge key point, a nose lower edge key point, a nose outside contour key point, etc. The mouth key point, for example, may include, but not limited to, at least one of an upper lip key point, a lower lip key point, etc.

In an optional example, the shoulder key point, for example, may include, but not limited to, at least one of a shoulder and head intersection key point located at an intersection position of the shoulder and the head, a shoulder contour midpoint key point located at a midpoint position between an arm root contour key point and the shoulder and head intersection key point, etc.

In an optional example, the arm key point, for example, may include, but not limited to, at least one of a wrist contour key point, an elbow contour key point, an arm root contour key point, a lower arm contour midpoint key point located at a midpoint position between the wrist contour key point and the elbow contour key point, an upper arm midpoint key point located at a midpoint position between the elbow contour key point and the arm root contour key point, etc.

In an optional example, the gesture key point, for example, may include, but not limited to, at least one of four vertex key points of a gesture box (i.e., a gesture bounding box), a central key point of the gesture box, etc.

In an optional example, the leg key point, for example, may include, but not limited to, at least one of a crotch key point, a knee contour key point, an ankle contour key point, a thigh root outside contour key point, a shank contour midpoint key point located at a midpoint position between the knee contour key point and the ankle contour key point, a thigh inner contour midpoint key point located at a midpoint position between the knee inner contour key point and the crotch key point, a thigh outer contour midpoint key point located at a midpoint position between the knee outer contour key point and the thigh root outside contour key point, etc.

In an optional example, the waist key point, for example, may include, but not limited to, at least one of N−1 equal division points generated by dividing the thigh root outside contour key point and the arm root contour key point into N equal parts, where N is greater than 1.

In an optional example, the foot key point, for example, may include, but not limited to, at least one of a tiptoe key point, a heel key point, etc.

In an optional example, the human skeleton key point, for example, may include, but not limited to at least one of a right shoulder skeleton key point, a right elbow skeleton key point, a right wrist skeleton key point, a left shoulder skeleton key point, a left elbow skeleton key point, a left wrist skeleton key point, a right hip skeleton key point, a right knee skeleton key point, a right ankle skeleton key point, a left hip skeleton key point, a left knee skeleton key point, a left ankle skeleton key point, a head top skeleton key point, a neck skeleton key point, etc.

In the embodiments of the present disclosure, positions of a plurality of key points may be preset to establish the correspondence between the deformation region and at least one key point, so as to make the position of deformation region correspond to the positions of the key point. When the parameter value of the deformation effect parameter of one deformation region is set, at least one key point may be selected directly from a preset key point set, so as to establish the correspondence between the deformation region and at least one key point.

For example, in one implementation, a plurality of key points may be defined respectively for the face and the gesture (hand) based on face detection and gesture detection, so as to establish the correspondence between the deformation region and the face key point or the gesture key point in the generation of a special effect.

Figure 4:
FIG. 4 is an exemplary schematic diagram of face key points according to the embodiments of the present disclosure.

For example, FIG. 4 is an exemplary schematic diagram of face key points in the embodiments of the present disclosure. Referring to FIG. 4, in one optional example, the face key points may be defined as follows.

| Key point item | Key point serial number | Key point item | Key point serial number |
| --- | --- | --- | --- |
| Face box (face contour key point) | 0-32 | Nose bridge | 43-46 |
| Left eyebrow | 33-37, 64-67 | Right eyebrow | 38-42, 68-71 |
| Left eye contour | 52-57, 72-73 | Right eye contour | 58-63, 75-76 |
| Left eye pupil | 74, 104 | Right eye pupil | 77, 105 |
| Nose lower edge | 47-51 | Nose outside contour | 78-83 |
| Upper lip | 84-90, 96-100 | Lower lip | 91-95, 101-103 |

In one optional example, hand key points may be defined as follows.

| Key point item | Key point serial number | Key point item | Key point serial number |
| --- | --- | --- | --- |
| Gesture box | 110-113 | Center | 114 |

Key points with the serial numbers 110-113 are four vertexes of a gesture bounding box (i.e., a hand bounding box) respectively, and a key point with the serial number 114 is a center of the gesture bounding box.

In one implementation of the embodiments of the present disclosure, the establishing a correspondence between the deformation region and predetermined at least one key point in the operation 104 may include: establishing a correspondence between a position reference point of the deformation region and the at least one key point; and/or establishing a correspondence between the position reference point of the deformation region and a central key point of a bounding box.

For example, when the key points in the correspondence established in the embodiments of the present disclosure are a head key point, a face key point, a shoulder key point, an arm key point, a waist key point, a leg key point, a foot key point, and a human skeleton key point, the correspondence between the position reference point of the deformation region (such as the center point of the deformation region, two points, on a circular boundary of a circular deformation region, having a connection line passing through the circle center, the four vertexes of a square deformation region) and at least one of the key points may be established; and when the key points in the correspondence established in the embodiments of the present disclosure are a head key point, a face key point, a gesture key point, and a human skeleton key point, the correspondence between the position reference point of the deformation region and the central key point of the corresponding bounding box (such as a head bounding box, a face bounding box, the gesture bounding box, or a human bounding box) may be established.

In one implementation of the embodiments of the present disclosure, the deformation effect parameter of the deformation region, for example, may be, but not limited to, at least one of the followings.

1. A display parameter (Display), configured to control whether to display a deformation effect of a deformation region. The parameter value of the display parameter includes two options, i.e., "Yes" and "No", when "Yes" is selected as the parameter value, it is indicated that the deformation effect of the deformation region is displayed on an image, and when "No" is selected as the parameter value, it is indicated that the deformation effect of the deformation region is not displayed on the image.

2. A trigger action parameter (TriggerType), configured to represent a trigger action for triggering the display of the deformation effect of the deformation region and referring to what action is used to trigger the display of the deformation effect of the deformation region. The parameter value of the trigger action parameter may include trigger actions, and the user may select at least one action from a preset action set as the trigger action. That is, when a corresponding trigger action is detected in a video or image, the display of the corresponding deformation effect of the deformation region may be triggered. For example, when it is detected that a trigger action "opening mouth" specified in the trigger action parameter appears in the video or image, the deformation effect of the deformation region is started to be displayed at the mouth. A display start time, a display end time, a display duration, etc. of the deformation effect of the deformation region may be determined according to parameter values of other parameters, for example, may be determined respectively according to a trigger delay parameter, and a trigger stop parameter.

3. A loop parameter (TriggerLoop), configured to represent the number of loop playbacks of the deformation effect. The number of loops may be selected by a user, and it may be exemplarily set that the selected number of 0 represents that the deformation special effect is always displayed.

4. A trigger delay parameter (TriggerDelay), configured to represent a time by which the display of the deformation effect of the deformation region is delayed, i.e., the number of frames after which the display of deformation effect of the deformation region is started when the trigger action in the trigger action parameter is detected from a certain frame in a video image. The time by which the display of the deformation effect of the deformation region may be set or selected as the parameter value of the trigger delay parameter.

5. A trigger stop parameter (TriggerStop), configured to represent an action for stopping the display of the deformation effect of the deformation region, and referring to what action is used to stop the display of the deformation effect of the deformation region. The parameter value of the trigger stop parameter may include trigger actions, and the user may select at least one action from the preset action set as the action for stopping the display of the deformation effect of the deformation region. That is, when a trigger action specified in the trigger stop parameter is detected in a video or image, the display of the corresponding deformation effect of the deformation region may be stopped. For example, for a case where when it is detected that the trigger action "opening mount" specified in the trigger action parameter appears in the video or image, the deformation effect of the deformation region is started to be displayed at the mouth, the parameter value in the trigger stop parameter may be set as "closing mouth". Therefore, when it is detected the "closing mouth" action appears in the video or image, the deformation effect of the deformation region disappears.

Figure 5:
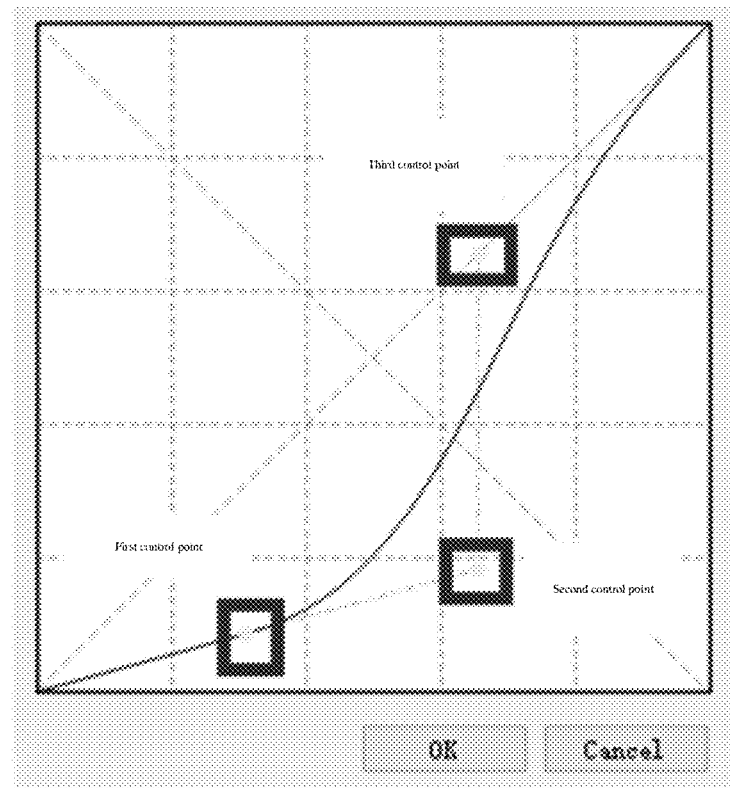
FIG. 5 is an exemplary schematic diagram of a deformation curve adjustment window according to the embodiments of the present disclosure.
Figure 6:
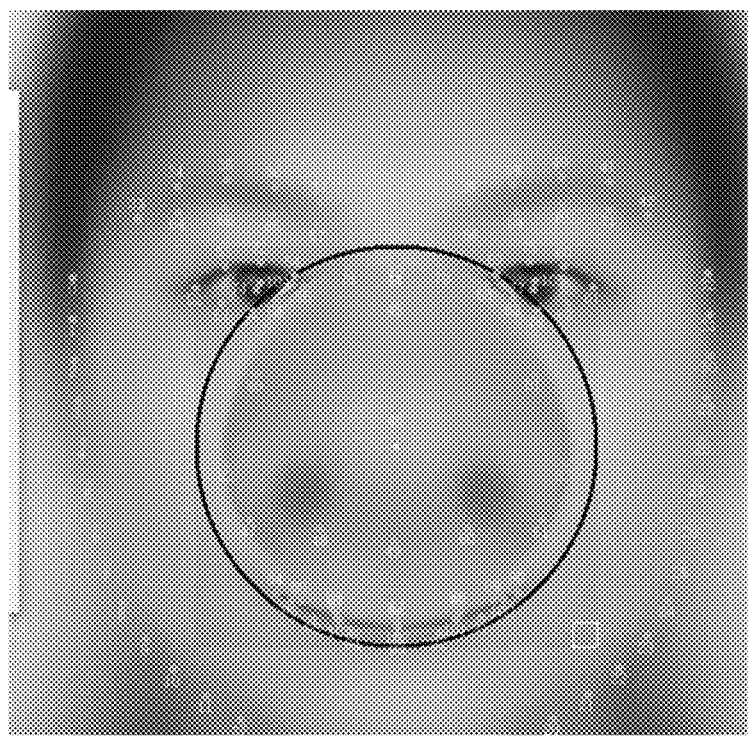
FIG. 6 is a schematic diagram of a deformation effect which is an outward stretching deformation effect according to the embodiments of the present disclosure.
Figure 7:
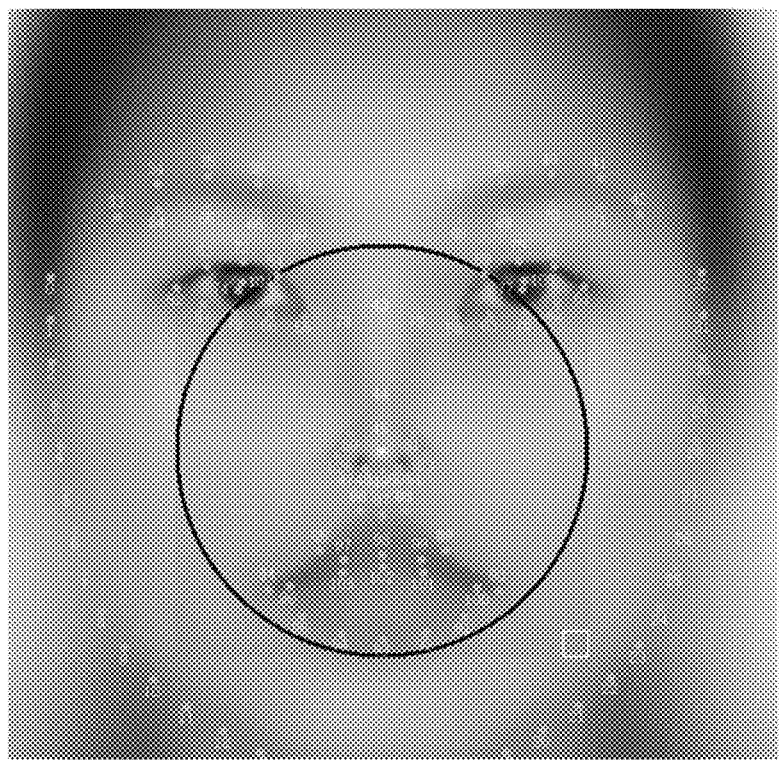
FIG. 7 is a schematic diagram of a deformation effect which is an inward stretching deformation effect according to the embodiments of the present disclosure.

6. A deformation effect control parameter (Transform), configured to control the deformation effect of the deformation region. In one example, the deformation effect of the deformation region may be controlled by a deformation curve. A deformation curve adjustment window may be opened, by clicking on a change button in the interactive interface, to adjust the parameter of the deformation to change the deformation effect. FIG. 5 is an exemplary schematic diagram of the deformation curve adjustment window according to the embodiments of the present disclosure. In one implementation, the parameter of the deformation curve includes at least one of a first control point parameter configured to control a stretching direction and a stretching radius of the deformation effect, a second control point parameter configured to control a transition smoothness of a middle region of the deformation region, and a third control point parameter configured to control a transition smoothness of a boundary region of the deformation region. The stretching direction of the deformation effect may include stretching outward from the center point of the deformation region, and/or stretching inward from the center point of the deformation region. In an optional example, the deformation curve is controlled by control points corresponding to the three control point parameters. The first control point is configured to control a stretching direction and a stretching radius of the deformation effect, so as to affect the degree of deformation and the size of the deformation region. When the first control point is located on the lower right corner of a region divided by a diagonal 1, the deformation region stretches outward from a deformation center point, and when the first control point is located on the upper left corner of the region divided by the diagonal 1, the deformation region stretches in a direction from a boundary of a circle to the deformation center point (i.e., inward stretching). FIGS. 6 and 7 are schematic diagrams of deformation effects which are an outward stretching deformation effect and an inward stretching deformation effect. The length of a straight line segment between the first control point and the lower left vertex controls the size of a region which is linearly deformed from the deformation center to the outside. The longer the straight line segment, the larger the linearly deformed region. The second control point is configured to control a transition smoothness of a middle region of the deformation region. When the second control point is closer to the first control point, the deformation effect of the middle region is more obvious, or otherwise, the transition smoothness of the middle region is better. The third control point is configured to control a transition smoothness of a boundary region of the deformation region (i.e., a boundary smoothness effect). When the third control point is closer to the upper right corner, the deformation effect of the boundary is more obvious, or otherwise, the transition between the boundary and the region outside the circle is smoother. A user can change a deformation display effect by adjusting the positions of the three control points. Because the first control point is configured to control the slope of a straight line, and the second control point and the third control point are configured to control the amplitude of a curve on the basis of the slope of the straight line, the moving positions of the three control points are restrained according to a parameter relationship.

7. A display scale parameter (Scale), configured to represent a reference basis for the change in the size of the deformation region, and used for achieving a display effect that the deformation region is large at a short distance and is small at a long distance. The parameter value of the display scale parameter (i.e., the reference basis for the change in the size of the deformation region) may be two or more key points (which may be represented as PointA and PointB) in preset key points. In this case, the size of the deformation region would change according to a change in a proportion of sizes formed by the two or more key points taken as the reference basis in the image.

8. A position parameter (Position), configured to represent a positional binding relationship between the deformation region and preset key points, and referring to the positional relationship between the deformation region and the preset key points in an image. The positions of specific key points, in the preset key points, may be selected to be bound to the deformation region. In an optional example, the preset key points in the position parameter may include two key points in the predetermined key points, the two key points being located on the boundary of the deformation region and having a connection line passing through the center point of the deformation region.

9. A rotation center parameter (RotateCenter), configured to represent a center point on which the rotation of the deformation region is based. In one optional example, the center point on which the rotation of the deformation region is based is the center point of the image.

10. A deformation center parameter (TransformCenter), configured to represent the center point of the deformation region.

Figure 8:
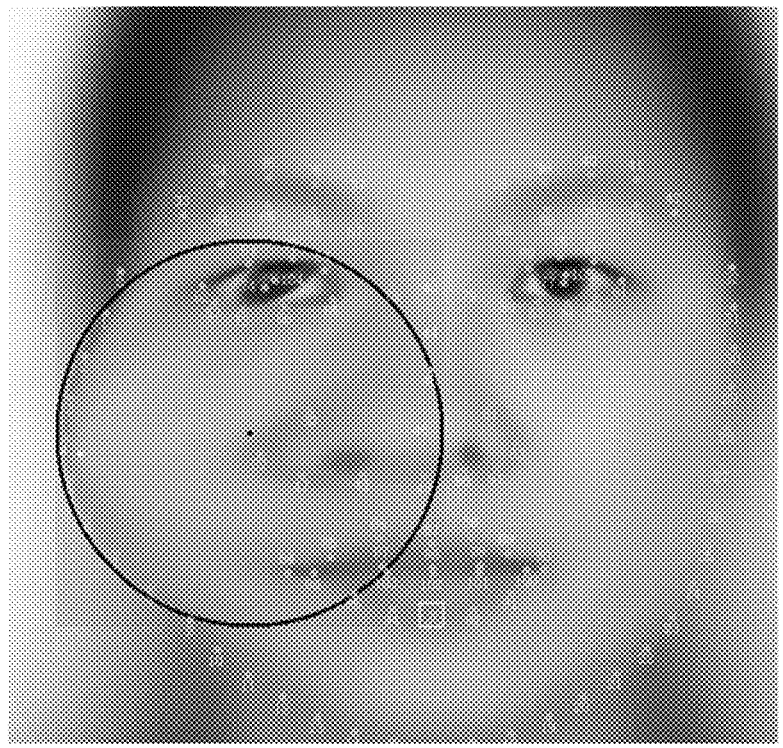
FIG. 8 is a schematic diagram of a deformation effect in which a mode transfer parameter is in a simple center point stretching mode according to the embodiments of the present disclosure.
Figure 9:
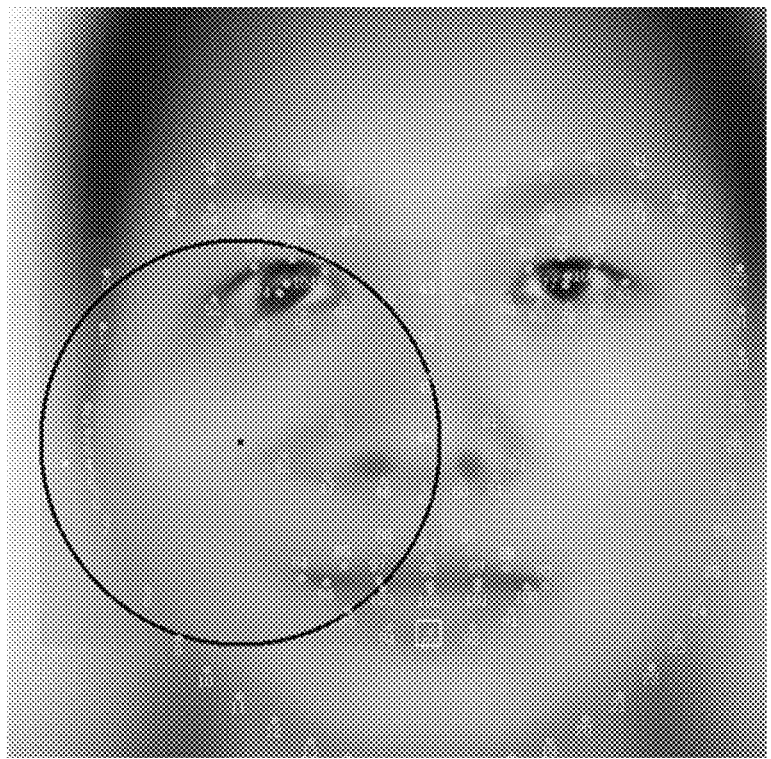
FIG. 9 is a schematic diagram of a deformation effect in which the mode transfer parameter is in a radial offset stretching mode according to the embodiments of the present disclosure.

11. A mode transfer parameter (Transfer), configured to transfer center point offset modes of the deformation region. In an optional example, the center point offset modes of the deformation region include a simple center point stretching mode and/or a radial offset stretching mode. The two center point offset modes of the deformation region may be transferred by the following two parameter values: (1) Yes: representing the simple center point stretching mode in which the deformation region is stretched by moving the position of the deformation center point in the circle by means of a mouse; and (2) No: the radial offset stretching mode in which the deformation region is stretched in a deformation circle on the basis of the deformation curved edited by the deformation effect control parameter. FIG. 8 is a schematic diagram of a deformation effect in which the mode transfer parameter is in the simple central point stretching mode according to the embodiments of the present disclosure. FIG. 9 is a schematic diagram of a deformation effect in which the mode transfer parameter is in the radial offset stretching mode according to the embodiments of the present disclosure.

12. A beautifying/make-up (beautifying and/or make-up) effect parameter, configured to represent a beautifying/make-up effect displayed at a preset part during displaying the deformation effect, such as red lips, colored lenses, and blue eyes. For example, red lips are displayed at the mouth during displaying the deformation effect.

In one embodiment, the preset key points in the position parameter include two key points, in predetermined key points, located on the boundary of the deformation region and having a connection line passing through the center point of the deformation region. Correspondingly, the operation 104 of the embodiment may include: establishing a correspondence between the deformation region and the two key points located on the boundary of the deformation region and having a connection line passing through the center point of the deformation region.

In an optional example, the trigger action corresponding to the trigger action parameter includes at least one of:

a trigger without an action (NULL), i.e., displaying a sub-material without any action;

an eye action, such as blinking eyes, closing eyes, and opening eyes;

a heat action, such as shaking the head, nodding the head, tilting the head, and turning the head;

an eyebrow action, such as raising eyebrows;

a hand action, such as a hand heart gesture, a palm-up gesture, a palm, a thumb-up gesture, congratulations with hands folded, a finger heart gesture, an OK gesture, a peace gesture, a pistol gesture, and an index finger;

a mouth action, such as opening the mouth and closing the mouth;

a shoulder action, such as shrugging shoulders; or other actions.

Figure 10:
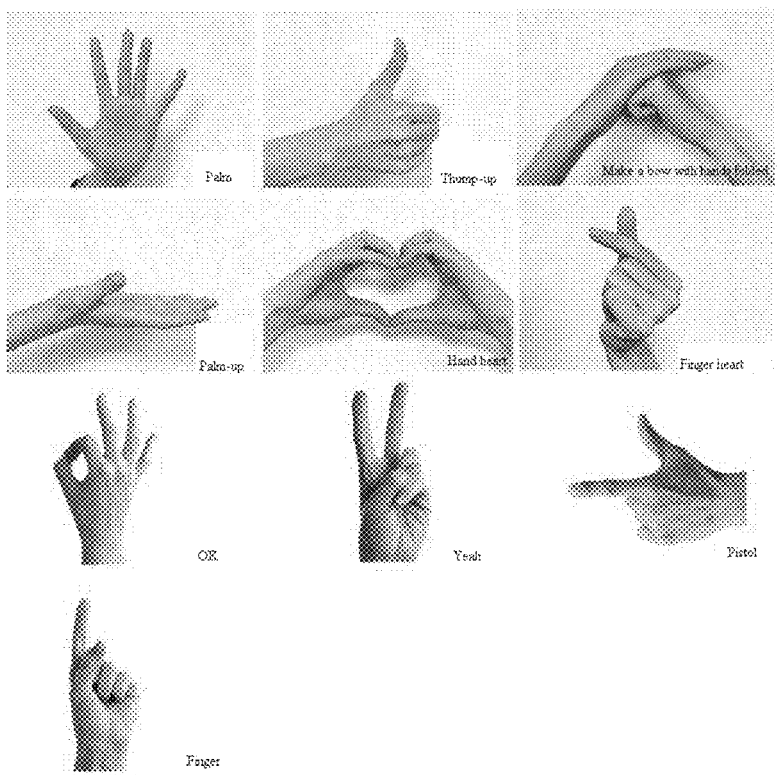
FIG. 10 is an exemplary schematic diagram of a hand action according to the embodiments of the present disclosure.

FIG. 10 is an exemplary schematic diagram of the hand action according to the embodiments of the present disclosure.

In addition, still referring to FIG. 2, the operation interface of the apparatus for generating a deformation special effect program file package according to the embodiments of the present disclosure may further include a content display bar. Correspondingly, in another embodiment of the method for generating a deformation special effect program file package of the present disclosure, the method may further include: displaying a reference image by means of the content display bar.

Exemplarily, the reference image, for example, may be an image of at least one part of a reference person, for example, at least one of the following images of the reference person: a complete image, a head image, a face image, a shoulder image, an arm image, a gesture image, a waist image, a leg image, a foot image, or the like.

In addition, in another embodiment of the method for generating a deformation special effect program file package of the present disclosure, the method may further include: receiving a reference point display instruction input through the interactive interface of the action bar and displaying a key point on the reference image; and/or receiving a reference point close instruction input through the interactive interface of the action bar, and not displaying the key point on the reference image.

In addition, in another embodiment of the method for generating a deformation special effect program file package of the present disclosure, the method may further include: displaying the deformation effect of the deformation region in the content display bar according to the parameter value of the deformation effect parameter of the deformation region. For example, the deformation region may be displayed in the content display bar according to the preset position and size of the deformation region.

After the deformation effect of the deformation region is displayed in the content display bar, the position of the deformation region in the content display bar can be changed or the size thereof can be adjusted. Therefore, in a further optional embodiment of the present disclosure, the method may further include: updating a display position of the deformation region in the content display bar according to a position movement operation on the deformation region received through the content display bar, and updating a corresponding parameter value in the deformation effect parameter of the deformation region; and/or updating a display size of the deformation region in the content display bar according to a size adjustment operation on the deformation region received through the content display bar, and updating a corresponding parameter value in the deformation effect parameter of the deformation region.

For example, a user may select, by means of a mouse, a deformation region displayed in the content display bar, move the mouse to a small box at the lower right corner of the deformation region, and move the small box to zoom the deformation region, so as to adjust the size of the deformation region. The user may select, by means of the mouse, a deformation region displayed in the content display bar and directly move the position of the deformation region to move the deformation region to a right or desired position. In subsequent playback of the deformation special effect program file package of the deformation region, the position and display proportion of the deformation region on a playback terminal would be consistent with the position and display proportion in the content display bar.

In addition, in another embodiment of the method for generating a deformation special effect program file package of the present disclosure, in the case that two or more deformation regions are included, an occlusion relationship between the two or more deformation regions may be adjusted. Hence, in a further optional embodiment of the present disclosure, the method may further include: adjusting a occlusion relationship between two or more deformation regions according to an image layer parameter adjustment instruction for the two or more deformation regions received through the interactive interface of the action bar; and displaying a deformation effect corresponding to the two or more deformation regions according to the adjusted occlusion relationship and parameter values of the deformation parameters corresponding to the two or more deformation regions.

In addition, in the embodiments of the method for generating a deformation special effect program file package of the present disclosure, the method may further include, before the generating the deformation special effect program file package: generating a special effect program file of the deformation region according to a preset deformation special effect program file and the parameter value of the deformation effect parameter of the deformation region, and displaying the special effect program file of the deformation region through a program file bar.

The deformation special effect program file, for example, may include a special effect program file generated by a JSON program or any other programs.

In addition, in yet embodiment of the method for generating a special effect program file package of the present disclosure, the method may further include: the apparatus for generating a deformation special effect program file package starts according to a received start instruction, and displays the operation interface, where the operation interface includes the action bar, the content display bar, and the program file bar.

As shown in FIG. 2, in an optional example, the operation interface includes a left region, a middle region, and a right region. Accordingly, displaying the operation interface may include: displaying the action bar on the left side of the operation interface, displaying the content display bar in the middle of the operation interface, and displaying the program file bar on the right side of the operation interface.

A parameter value may be set for the deformation effect parameter of each deformation region through an interactive interface 21 in the action bar on the left side. The content display bar takes an average face as a reference face, and directly displays al the deformation regions. The positions of the displayed deformation regions may be moved by means of a mouse. The program file display bar on the right side is configured to display, by a display region 22 therein, content of a special effect program file for which the parameter values are set currently, and the deformation special effect program file package may be imported through a save instruction interface 23 in the program file display bar, i.e., the deformation special effect program file package is generated and saved.

Figure 11:
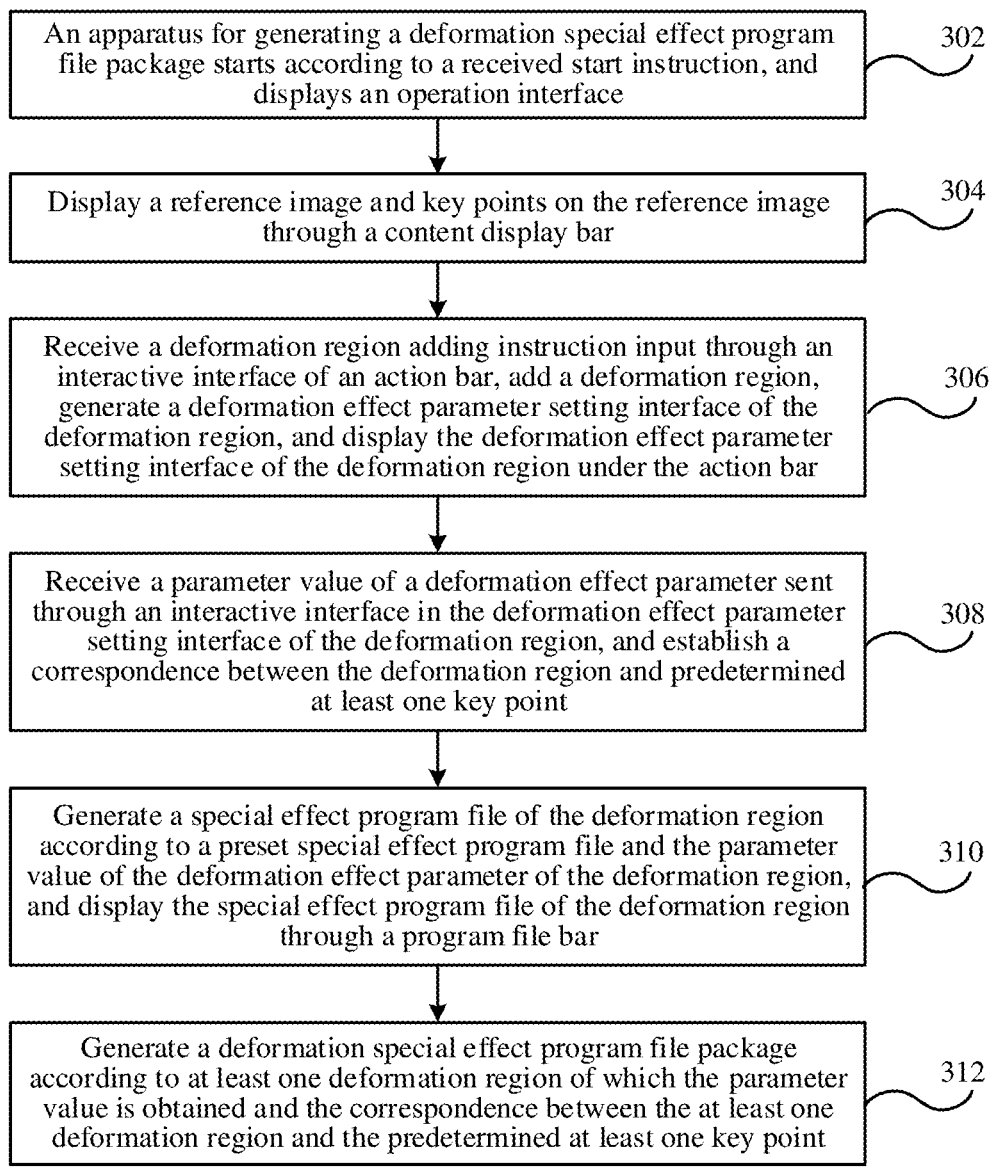
FIG. 11 is a flowchart of another embodiment of the method for generating a deformation special effect program file package of the present disclosure.

FIG. 11 is a flowchart of still another embodiment of the method for generating a special effect program file package of the present disclosure. As shown in FIG. 11, the method for generating a special effect program file package according to this embodiment includes the following steps.

At 302, an apparatus for generating a deformation special effect program file package starts according to a received start instruction, and displays an operation interface.

The operation interface includes an action bar, a content display bar, and a program file bar.

At 304, a reference image and key points on the reference image are displayed through the content display bar.

Exemplarily, the reference image, for example, may be an image of at least one part of a reference person.

In an optional example, the operation 304 may be performed by a processor by invoking a corresponding instruction stored in a memory, or may be performed by the operation interface run by the processor or the content display bar in the operation interface.

At 306, a deformation region adding instruction is input through an interactive interface of the action bar, a deformation region is added, a deformation effect parameter setting interface of the at least one deformation region is generated, and the deformation effect parameter setting interface of the at least one deformation region is displayed under the action bar.

In an optional example, the operation 306 may be performed by a processor by invoking a corresponding instruction stored in a memory, or may be performed by an adding module and the operation interface run by the processor or the action bar in the operation interface.

At 308, a parameter value of a deformation effect parameter sent through an interactive interface in the deformation effect parameter setting interface of the at least one deformation region is received, and the correspondence between the deformation region and predetermined at least one key point is established.

In an optional example, the operation 308 may be performed by a processor by invoking a corresponding instruction stored in a memory, or may be performed by the operation interface run by the processor or the action bar and an establishing module in the operation interface.

At 310, a special effect program file of the deformation region is generated according to a preset special effect program file and the parameter value of the deformation effect parameter of the deformation region, and the special effect program file of the deformation region is displayed through a program file bar In one implementation of the embodiments of the present disclosure, the special effect program file, for example, may include, but not limited to, a special effect program file generated by a JSON program or other executable programs.

If a plurality of deformation regions is required to be added, operations 306-310 may be performed for the deformation regions respectively. Then, operation 312 is performed for all the deformation regions.

In an optional example, the operation 310 may be performed by a processor by invoking a corresponding instruction stored in a memory, or may be performed by a first generating module and the operation interface run by the processor or the program file bar in the operation interface.

At 312, a deformation special effect program file package is generated according to at least one deformation region of which the parameter value is obtained and the correspondence between the at least one deformation region and the predetermined at least one key point.

In an optional example, the operation 312 may be performed by a processor by invoking a corresponding instruction stored in a memory, or may be performed by a first generating module run by the processor.

In addition, after generating the deformation special effect program file package based on any one of the foregoing embodiments of the present disclosure, the method may further include: saving, according to a received save instruction, the deformation special effect program file package at the position indicated by the save instruction.

In one implementation, the saving, according to a received save instruction, the deformation special effect program file package at the position indicated by the save instruction may include:

in response to receiving the save instruction, displaying a save path selection interface and a compression interface;

receiving a save position sent through the save path selection interface; receiving a compression mode sent on the basis of the compression interface and compressing the deformation special effect program file package according to the compression mode to generate a compressed file package; and saving the compressed file package to a file folder indicated by the save position.

If the size of the deformation special effect program file package is large, it is not suitable for running in a mobile phone terminal. In embodiments of the present disclosure, the special effect program file package may be compressed and then saved, so as to be imported to the mobile phone terminal to generate a deformation special effect.

After being generated based on the embodiments of the present disclosure, the deformation special effect program file package can be imported to the terminal, so as to generate a deformation special effect for a video or image played back by the terminal.

Figure 12:
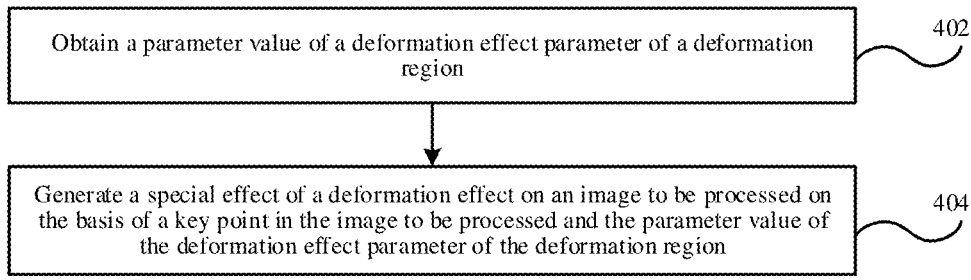
FIG. 12 is a flowchart of one embodiment of a method for generating a deformation special effect of the present disclosure.

FIG. 12 is a flowchart of one embodiment of a method for generating a deformation special effect of the present disclosure. The method for generating a deformation special effect according to the embodiments of the present disclosure, for example, may be implemented by, but not limited to, an apparatus (called an apparatus for generating a deformation special effect in the embodiments of the present disclosure). The apparatus for generating a deformation special effect, for example, may be an AR engine, an electronic device having an AR drawing function (e.g., an electronic device having an AR engine), etc. As shown in FIG. 12, the method for generating a deformation special effect according to this embodiment includes the following steps.

At 402, a parameter value of a deformation effect parameter of a deformation region is obtained.

In an optional example, the operation 402 may be performed by a processor by invoking a corresponding instruction stored in a memory, or may be performed by a second obtaining module run by the processor.

At 404, a special effect of a deformation effect is generated on an image to be processed on the basis of a key point in the image to be processed and the parameter value of the deformation effect parameter of the deformation region.

In an optional example, the operation 404 may be performed by a processor by invoking a corresponding instruction stored in a memory, or may be performed by a second generating module run by the processor.

On the basis of the method for generating a deformation special effect provided by the embodiments of the present disclosure, the parameter value of the deformation effect parameter of the deformation region is obtained, and the special effect of the deformation effect is generated on the image to be processed on the basis of the key point in the image to be processed and the parameter value of the deformation effect parameter of the deformation region. The embodiments of the present disclosure perform key point detection on the image to be processed by means of the parameter value of the deformation effect parameter of the deformation region in the pre-generated deformation special effect program file package, and generate the deformation special effect on the image to be processed to implement the deformation special effect of the image, thereby improving or enriching the display/playback effect and/or the interest of the image.

In another embodiment of the method for generating a deformation special effect of the present disclosure, before the operation 402, i.e., obtaining the parameter value of the deformation effect parameter of the deformation region, the method may further include: importing a deformation special effect program file package. Correspondingly, in the operation 402 of this embodiment, the parameter value of the deformation effect parameter of the deformation region in the deformation special effect program file package is obtained. Exemplarily, the deformation special effect program file package may, but not limited to, be generated by the method for generating a deformation special effect program file package according to any one of the embodiments of the present disclosure.

Figure 13:
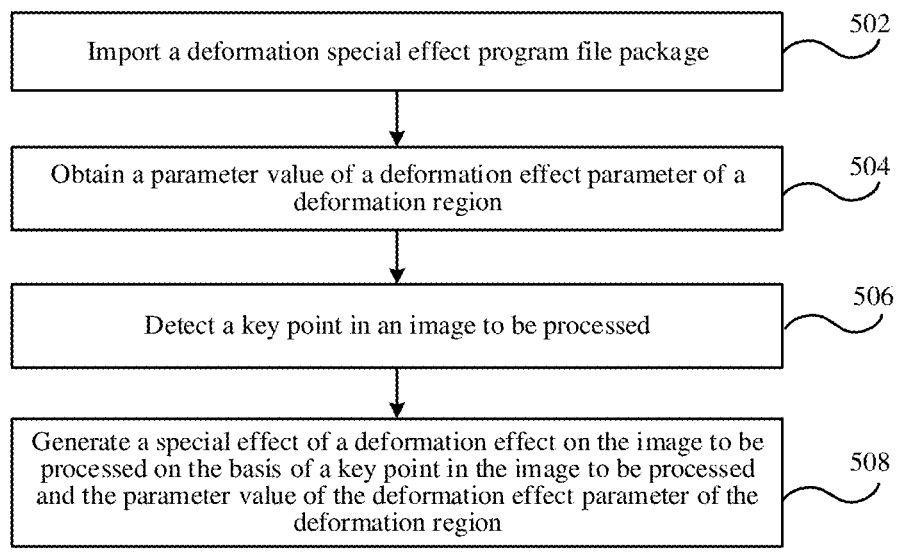
FIG. 13 is a flowchart of another embodiment of the method for generating a deformation special effect of the present disclosure.

FIG. 13 is a flowchart of another embodiment of the method for generating a deformation special effect of the present disclosure. As shown in FIG. 13, the method for generating a deformation special effect according to this embodiment includes the following steps.

At 502, a deformation special effect program file package is imported.

In an optional example, the operation 502 may be executed by the processor by invoking a corresponding instruction stored in the memory, or may be executed by an importing module run by the processor.

At 504, a parameter value of a deformation effect parameter of a deformation region is obtained.

The parameter value of the deformation effect parameter of the deformation region, for example, may include, but not limited to, a correspondence between the deformation region and predetermined at least one key point.

In an optional example, the operation 504 may be performed by a processor by invoking a corresponding instruction stored in a memory, or may be performed by a second obtaining module run by the processor.

At 506, a key point in an image to be processed is detected.

In an optional example, the operation 506 may be performed by a processor by invoking a corresponding instruction stored in a memory, or may be performed by a first detecting module run by the processor.

In the embodiments of the method for generating a deformation special effect of the present disclosure, the image to be processed, for example, may include, but not limited to any one of more of a static image, an image in a video, etc.

In one implementation, a neural network may be used to perform, for the image to be processed, detection on the key point involved in the correspondence, and to output a key point detection result. The key point detection result, for example, may include, but not limited to, at least one of the position of the key point involved in the correspondence in the image to be processed, and a preset serial number of the key point involved in the correspondence in the special effect program file package.

At 508, a special effect of a deformation effect is generated on the image to be processed on the basis of a key point in the image to be processed and the parameter value of the deformation effect parameter of the deformation region.

In an optional example, the operation 508 may be performed by a processor by invoking a corresponding instruction stored in a memory, or may be performed by a second generating module run by the processor.

In one implementation, the deformation special effect program file package may be imported in the following mode: invoking a first interface function for reading a deformation region to read the deformation special effect program file package into a memory; and parsing the deformation special effect program file package to obtain a deformation special effect program file, the deformation special effect program file including the parameter value of the deformation effect parameter.

Exemplarily, the deformation special effect program file, for example, may include, but not limited to, a deformation special effect program file generated by a JSON program or any other executable program.

In another implementation, the parameter value of the deformation effect parameter of the deformation region may be obtained in the following mode: creating a sticker handle by means of a second interface function for creating a sticker handle; and reading the parameter value of the deformation effect parameter of the deformation region in the deformation special effect program file and storing same to the sticker handle.

In still another implementation, the method may further include: obtaining, according to the parameter value of the deformation effect parameter of the deformation region in the deformation special effect program file in the sticker handle, a position of the deformation region displayed in the image to be processed.

Optionally, if the image to be processed is an image in a video, the method for generating a deformation special effect according to the embodiments may further include: obtaining a video frame number of the deformation region displayed in image to be processed, and reading the image corresponding to the video frame number from the video where the image to be processed is located in advance.

In still another implementation, the operation 508, i.e., the generating the special effect of the deformation effect on the image to be processed on the basis of the key point in the image to be processed and the parameter value of the deformation effect parameter of the deformation region, may include: invoking a third interface function for rendering a deformation region to read, from the sticker handle, the deformation region to be displayed on the image to be processed; determining, according the key point in the image to be processed and the parameter value of the deformation effect parameter of the deformation region to be displayed, the display position of the deformation region on the image to be processed; and displaying, according to the display position of the deformation region on the image to be processed, the deformation region at the display position on the image to be processed.

In addition, in a further implementation, the method may further include:

in response to the completion of the playback of the deformation special effect program file package, invoking a fourth interface function for destroying a sticker handle to destroy the sticker handle.

Optionally, in the embodiments of the method for generating a deformation special effect of the present disclosure, the deformation effect parameter may include: a trigger action parameter, the trigger action parameter being configured to represent a trigger action for triggering the display of the deformation effect of the deformation region. Correspondingly, the method for generating a deformation special effect according to this embodiment may further include: detecting whether a trigger action corresponding to the parameter value of the trigger action parameter is present in the image to be processed. The operation 508, i.e., the generating the special effect of the deformation effect on the image to be processed on the basis of the key point in the image to be processed and the parameter value of the deformation effect parameter of the deformation region, may include: in response to detecting that the trigger action corresponding to the parameter value of the trigger action parameter is present in the image to be processed, generating the special effect of the deformation effect on the image to be processed on the basis of the key point in the image to be processed and the parameter value of the deformation effect parameter of the deformation region.

Optionally, in the embodiments of the method for generating a deformation special effect of the present disclosure, the deformation effect parameter may include: a beautifying/make-up (beautifying and/or make-up) effect parameter, the beautifying/make-up effect parameter being configured to represent a beautifying/make-up effect displayed at a preset part during displaying the deformation effect. Correspondingly, the method for generating a deformation special effect according to this embodiment may further include: displaying, on the basis of the key point in the image to be processed and the parameter value of the deformation effect parameter of the deformation region, the beautifying/make-up effect on the image to be processed according to the beautifying/make-up effect parameter when generating the special effect of the deformation effect on the image to be processed.

The embodiments of the method for generating a deformation special effect of the present disclosure may be applied to various display scenarios of the image to be displayed or video playback scenarios. For example, the method may be applied to a live video scenario including a person to generate a deformation special effect for a live video, for example, generating a deformation effect of a deformation region at the parts, such as the ear, hand, face, hair, neck, and shoulder of a person who is making a live video, may also be applied to an image to be processed including a person to generate a deformation special effect for the image to be processed, for example, generating a deformation special effect at a certain local portion of the face of the image to be processed, etc.

Any method for generating a deformation special effect program file package and method for generating a deformation special effect provided in the embodiments of the present disclosure may be executed by any appropriate device having data processing capability, including, but not limited to, a terminal device, a server, or the like. Alternatively, any method for generating a deformation special effect program file package and method for generating a deformation special effect provided in the embodiments of the present disclosure may be executed by a processor. For example, the processor executes any method for generating a deformation special effect program file package and method for generating a deformation special effect mentioned in the embodiments of the present disclosure by invoking corresponding instructions stored in a memory. Details are not described below repeatedly.

A person of ordinary skill in the art may understand that all or some of steps for implementing the foregoing method embodiments are achieved by a program by instructing related hardware; the foregoing program can be stored in a computer-readable storage medium; when the program is executed, steps including the foregoing method embodiments are executed. Moreover, the foregoing storage medium includes various media capable of storing a program code such as an ROM, an RAM, a magnetic disk, or an optical disk.

Figure 14:
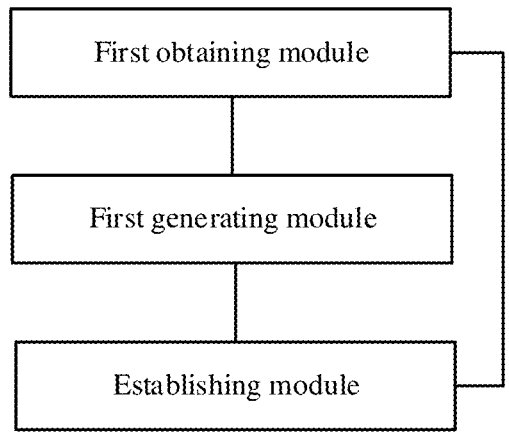
FIG. 14 is a schematic structural diagram of one embodiment the apparatus for generating a deformation special effect program file package of the present disclosure.

FIG. 14 is a schematic structural diagram of one embodiment the apparatus for generating a deformation special effect program file package of the present disclosure. The apparatus for generating a deformation special effect program file package according to the embodiments of the present disclosure may be used for implementing the method for generating a deformation special effect program file package of the present disclosure. As shown in FIG. 14, the apparatus for generating a deformation special effect program file package according to this embodiment includes: a first obtaining module, an establishing module, and a first generating module, where the first obtaining module is configured to obtain a parameter value of a deformation effect parameter of at least one deformation region;

the establishing module is configured to establish a correspondence between the at least one deformation region and predetermined at least one key point; and the first generating module is configured to generate a deformation special effect program file package according to the at least one deformation region of which the parameter value is obtained and the correspondence.

On the basis of the apparatus for generating a deformation special effect program file package provided by the embodiments of the present disclosure, the parameter value of the deformation effect parameter of at least one deformation region is obtained, a correspondence between the at least one deformation region and predetermined at least one key point is established, and the deformation special effect program file package is generated according to the at least one deformation region of which the parameter value is obtained and the correspondence, such that a deformation effect is added to an image on the basis of the deformation special effect program file package to implement a deformation special effect of the image. The embodiments of the present disclosure can generate a rendering engine executable deformation special effect program file without manually writing a program file, feature simple operations and a short required time, improve the overall efficiency of the implementation of a deformation special effect, and effectively ensure the accuracy of the deformation special effect.

Figure 15:
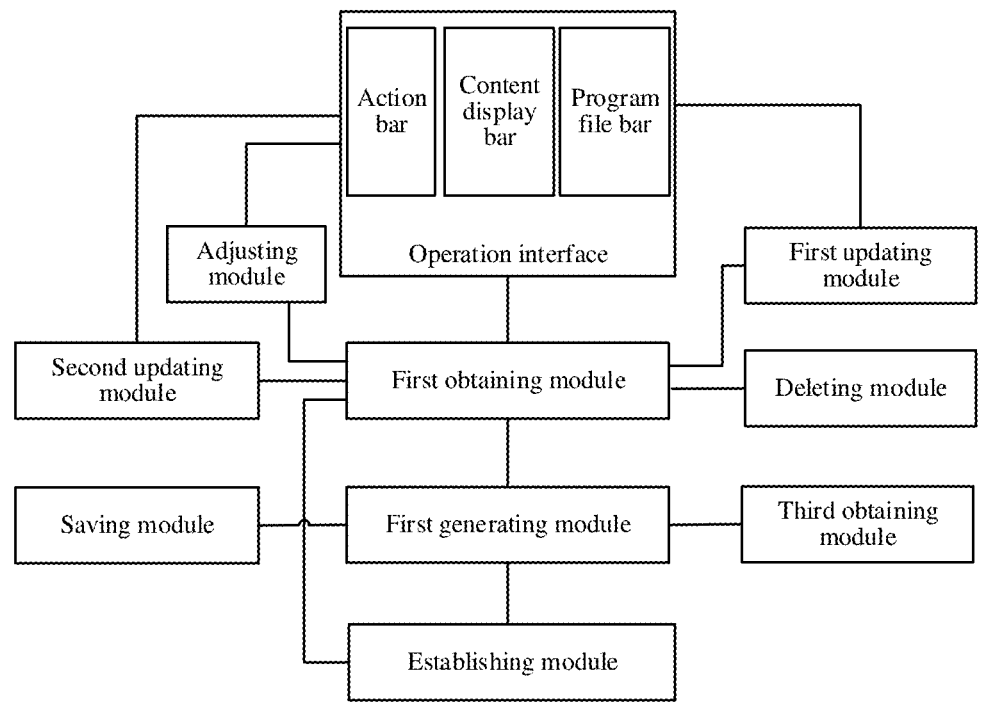
FIG. 15 is a schematic structural diagram of another embodiment of the apparatus for generating a deformation special effect program file package of the present disclosure.

FIG. 15 is a schematic structural diagram of another embodiment of the apparatus for generating a deformation special effect program file package of the present disclosure. As compared with the embodiment shown in FIG. 14, the generating apparatus according to the embodiment shown in FIG. 15 further includes: an adding module, configured to add at least one deformation region.

In one implementation, if there are a plurality of deformation regions, the first obtaining module is configured to: perform batch obtaining of parameter values of the deformation effect parameters of the plurality of deformation regions; and/or respectively obtain parameter values of the deformation effect parameters of at least some of the plurality of deformation regions; and/or obtain another deformation region and a parameter value of the deformation effect parameter of the another deformation region by duplicating one deformation region.

In addition, referring to FIG. 15 again, in another embodiment of the apparatus for generating a deformation special effect program file package of the present disclosure, the apparatus may further include: an action bar comprising an interactive interface and configured to receive a deformation region adding instruction input through the interactive interface, add the at least one deformation region, generate a deformation effect parameter setting interface of the at least one deformation region, and display the deformation effect parameter setting interface of the at least one deformation region under the action bar. Correspondingly, in this embodiment, the first obtaining module is configured to obtain the parameter value of the deformation effect parameter of the deformation region through the deformation effect parameter setting interface.

In one implementation, the first obtaining module is configured to: obtain a position parameter of the deformation region by moving the deformation region on a reference image; and/or obtain a range of the deformation region by adjusting the size of the deformation region; and/or obtain a parameter value of the deformation effect parameter of the deformation region by adjusting a deformation curve for controlling a deformation effect; and/or obtain a parameter value of the deformation effect parameter of the deformation region by receiving a parameter value of a deformation effect control parameter.

In an optional example, the first obtaining module is configured to: in response to receiving a parameter value of a deformation effect parameter sent through an interactive interface in the deformation effect parameter setting interface of the deformation region, take the set parameter value as the parameter value of the deformation effect parameter of the deformation region; and/or in response to not receiving a parameter value of a deformation effect parameter sent through an interactive interface in the deformation effect parameter setting interface of the deformation region, take a preset parameter value as the parameter value of the deformation effect parameter of the deformation region.

In addition, referring to FIG. 15 again, in still another embodiment of the apparatus for generating a deformation special effect program file package of the present disclosure, the apparatus may further include: a deleting module, configured to receive a deformation region deletion instruction input through the interactive interface of the action bar, and to delete the deformation region and the parameter value of the deformation effect parameter of the deformation region.

In the embodiments of the present disclosure, positions of a plurality of key points may be preset to establish the correspondence between the deformation region and at least one key point, so as to make the position of deformation region correspond to the positions of the key point. When the parameter value of the deformation effect parameter of one deformation region is set, at least one key point may be selected directly from a preset key point set, so as to establish the correspondence between the deformation region and at least one key point.

For example, in one implementation, a plurality of key points may be defined respectively for the face and the gesture (hand) based on face detection and gesture detection, so as to establish the correspondence between the deformation region and the face key point or the gesture key point in the generation of a special effect.

In one implementation, the establishing module is configured to: establish a correspondence between a position reference point of the deformation region and the at least one key point; and/or establish the correspondence between the position reference point of the deformation region and a center key point of a detection bounding box.

In one embodiment, the preset key points in the position parameter include two key points, in predetermined key points, located on the boundary of the deformation region and having a connection line passing through the center point of the deformation region. Correspondingly, in this embodiment, the establishing module is configured to: establish a correspondence between the deformation region and the two key points located on the boundary of the deformation region and having a connection line passing through the center point of the deformation region.

In addition, referring to FIG. 15 again, in another embodiment of the apparatus for generating a deformation special effect program file package of the present disclosure, the apparatus may further include: a content display bar, configured to display a reference image.

Exemplarily, the reference image, for example, may be an image of at least one part of a reference person, for example, at least one of the following images of the reference person: a complete image, a head image, a face image, a shoulder image, an arm image, a gesture image, a waist image, a leg image, a foot image, or the like.

Optionally, in the embodiment, the action bar may further be configured to: receive a reference point display instruction input through the interactive interface, for example, the interactive interface 24 in FIG. 2, and display a key point on the reference image; and/or receive a reference point close instruction input through the interactive interface of the action bar, and not display the key point on the reference image.

Optionally, in another embodiment, the content display bar may further be configured to display the deformation effect of the deformation region in the content display bar according to the parameter value of the deformation effect parameter of the deformation region.

Optionally, in another embodiment, the content display bar may further be configured to receive a position movement operation on the deformation region. Correspondingly, referring to FIG. 15 again, the apparatus according to this embodiment may further include: a first updating module, configured to update a display position of the deformation region in the content display bar according to the position movement operation on the deformation region received through the content display bar, and to update a corresponding parameter value in the deformation effect parameter of the deformation region.

Optionally, in another embodiment, the content display bar may further be configured to receive a size adjustment operation on the deformation region. Correspondingly, referring to FIG. 15 again, the apparatus according to this embodiment may further include: a second updating module, configured to update a display size of the deformation region in the content display bar according to the size adjustment operation on the deformation region received through the content display bar, and to update a corresponding parameter value in the deformation effect parameter of the deformation region.

Optionally, in another embodiment, the action bar may further be configured to: receive an image layer parameter adjustment instruction for two or more deformation regions through the interactive interface, for example, the interactive interface 25 in FIG. 2. Correspondingly, referring to FIG. 15 again, the apparatus according to this embodiment may further include: an adjusting module, configured to adjust a occlusion relationship between two or more deformation regions according to the image layer parameter adjustment instruction for the two or more deformation regions received through the interactive interface of the action bar, and to instruct the content display bar to display a deformation effect corresponding to the two or more deformation regions according to the adjusted occlusion relationship and parameter values of the deformation parameters corresponding to the two or more deformation regions.

Optionally, in another embodiment, the first generating module is further configured to generate a special effect program file of the deformation region according to a preset deformation special effect program file and the parameter value of the deformation effect parameter of the deformation region, and to display the special effect program file of the deformation region through a program file bar. Correspondingly, referring to FIG. 15 again, the apparatus according to this embodiment may further include: the program file bar, configured to display the special effect program file of the deformation region. The deformation special effect program file, for example, may include, but not limited to, a special effect program file generated by a JSON program.

Furthermore, referring to FIG. 15 again, the apparatus for generating a deformation special effect program file package according to the embodiments of the present disclosure may further include: an operation interface, where the operation interface includes the action bar, the content display bar, and the program file bar.

In one implementation, the operation interface includes a left region, a middle region, and a right region. The action bar is on the left side of the operation interface, the content display bar is in the middle of the operation interface, and the program file bar is on the right side of the operation interface.

In addition, referring to FIG. 15 again, the apparatus for generating a deformation special effect program file package according to the embodiments of the present disclosure may further include: a saving module, configured to save, according to a received save instruction, a deformation special effect program file package at the position indicated by the save instruction.

In one implementation, the saving module is configured to: in response to receiving the save instruction, display a save path selection interface and a compression interface; receive a save position sent through the save path selection interface; receive a compression mode sent on the basis of the compression interface, and compress the deformation special effect program file package according to the compression mode to generate a compressed file package; and store the compressed file package to a file folder indicated by the save position.

Figure 16:
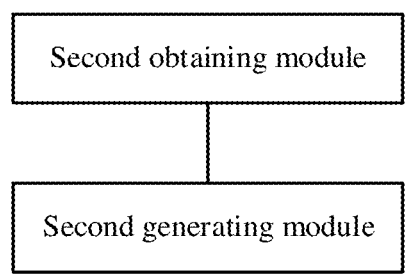
FIG. 16 is a schematic structural diagram of one embodiment an apparatus for generating a deformation special effect of the present disclosure.

FIG. 16 is a schematic structural diagram of one embodiment an apparatus for generating a deformation special effect of the present disclosure. The apparatus for generating a deformation special effect according to the embodiments of the present disclosure may be used for implementing the method for generating a deformation special effect of the present disclosure. The apparatus for generating a deformation special effect according to the embodiments of the present disclosure, for example, may be an AR engine, an electronic device having an AR drawing function (e.g., an electronic device having an AR engine), etc. As shown in FIG. 16, the apparatus for generating a deformation special effect according to this embodiment includes a second obtaining module and a second generating module, where the second obtaining module is configured to obtain a parameter value of a deformation effect parameter of a deformation region; and the second generating module is configured to generate a special effect of a deformation effect on an image to be processed on the basis of a key point in the image to be processed and the parameter value of the deformation effect parameter of the deformation region.

On the basis of the apparatus for generating a deformation special effect provided by the embodiments of the present disclosure, the parameter value of the deformation effect parameter of the deformation region is obtained, and the special effect of the deformation effect is generated on the image to be processed on the basis of the key point in the image to be processed and the parameter value of the deformation effect parameter of the deformation region. The embodiments of the present disclosure perform key point detection on the image by means of the parameter value of the deformation effect parameter of the deformation region in the pre-generated deformation special effect program file package, and generate the deformation special effect on the image to implement the deformation special effect of the image, thereby improving the playback effect of the image.

Figure 17:
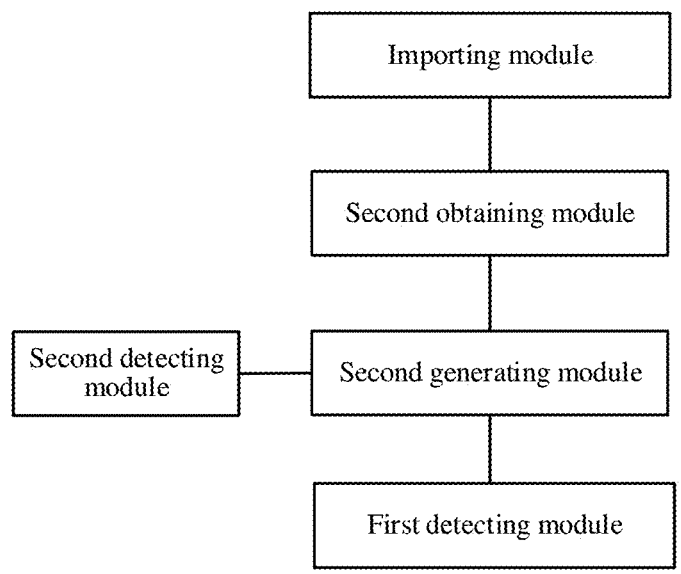
FIG. 17 is a schematic structural diagram of another embodiment of the apparatus for generating a deformation special effect of the present disclosure.

FIG. 17 is a schematic structural diagram of another embodiment of the apparatus for generating a deformation special effect of the present disclosure. As compared with the embodiment shown in FIG. 16, the apparatus for generating a deformation special effect according to the embodiment shown in FIG. 17 further includes: an importing module, configured to import a deformation special effect program file package. Correspondingly, in this embodiment, the second generating module is configured to obtain the parameter value of the deformation effect parameter of the deformation region in the deformation special effect program file package.

Exemplarily, the deformation special effect program file package is a deformation special effect program file package generated by the method or apparatus for generating a deformation special effect program file package according to any one of the embodiments of the present disclosure.

In addition, referring to FIG. 17 again, in another embodiment of the apparatus for generating a deformation special effect, the apparatus further includes: a first detecting module, configured to detect a key point in an image to be processed.

In one implementation, the first detecting module may include: a neural network, configured to perform, for the image to be processed, detection on the key point involved in the correspondence, and to output a key point detection result. The key point detection result, for example, may include, but not limited to, at least one of the position of the key point involved in the correspondence in the image to be processed, and a preset serial number of the key point involved in the correspondence.

In one implementation, the parameter value of the deformation effect parameter of the deformation region may include a correspondence between the deformation region and predetermined at least one key point.

In one implementation, the importing module is configured to: invoke a first interface function for reading a deformation region to read the deformation special effect program file package into a memory; and parse the deformation special effect program file package to obtain a deformation special effect program file, the deformation special effect program file including the parameter value of the deformation effect parameter.

The deformation special effect program file, for example, may include a special effect program file generated by a JSON program or any other programs.

In one implementation, the second obtaining module is configured to: create a sticker handle by means of a second interface function for creating a sticker handle; and read the parameter value of the deformation effect parameter of the deformation region in the deformation special effect program file and store same to the sticker handle.

In an optional example, the second generating module is configured to: invoke a third interface function for rendering a deformation region to read, from the sticker handle, the deformation region to be displayed on the image to be processed; determine, according the key point in the image to be processed and the parameter value of the deformation effect parameter of the deformation region to be displayed, the display position of the deformation region on the image to be processed; and display, according to the display position of the deformation region on the image to be processed, the deformation region at the display position on the image to be processed.

In a further optional example, if the image to be processed is an image to be processed in a video, the second generating module is further configured to: obtain a video frame number of the deformation region displayed in the video where the image to be processed is located, and read the image corresponding to the video frame number from the video in advance.

In addition, in another embodiment of the apparatus for generating a deformation special effect, the second obtaining module may further be configured to, in response to the completion of the playback of the deformation special effect program file package, invoke a fourth interface function for destroying a sticker handle to destroy the sticker handle.

In one implementation, the deformation effect parameter may include: a trigger action parameter, the trigger action parameter being configured to represent a trigger action for triggering the display of the deformation effect. Correspondingly, referring to FIG. 17 again, in still another embodiment of the apparatus for generating a deformation special effect, the apparatus further includes a second detecting module, configured to detect whether a trigger action corresponding to the parameter value of the trigger action parameter is present in the image to be processed. Correspondingly, in this embodiment, the second generating module is configured to: in response to detecting that the trigger action corresponding to the parameter value of the trigger action parameter is present in the image to be processed, generate the special effect of the deformation effect on the image to be processed on the basis of the key point in the image to be processed and the parameter value of the deformation effect parameter of the deformation region.

In one implementation, the deformation effect parameter may include: a beautifying/make-up (beautifying and/or make-up) effect parameter, the beautifying/make-up effect parameter being configured to represent a beautifying/make-up effect displayed at a preset part during displaying the deformation effect. Correspondingly, in this embodiment, the second generating module may further be configured to display, on the basis of the key point in the image to be processed and the parameter value of the deformation effect parameter of the deformation region, the beautifying/make-up effect on the image to be processed according to the beautifying/make-up effect parameter when generating the special effect of the deformation effect on the image to be processed.

In addition, another electronic device provided in the embodiments of the present disclosure includes:

a memory, configured to store a computer program; and a processor, configured to execute the computer program stored in the memory, where when the computer program is executed, the method for generating a deformation special effect program file package or the method for generating a deformation special effect according to any one of the embodiments of the present disclosure is implemented.

Figure 18:
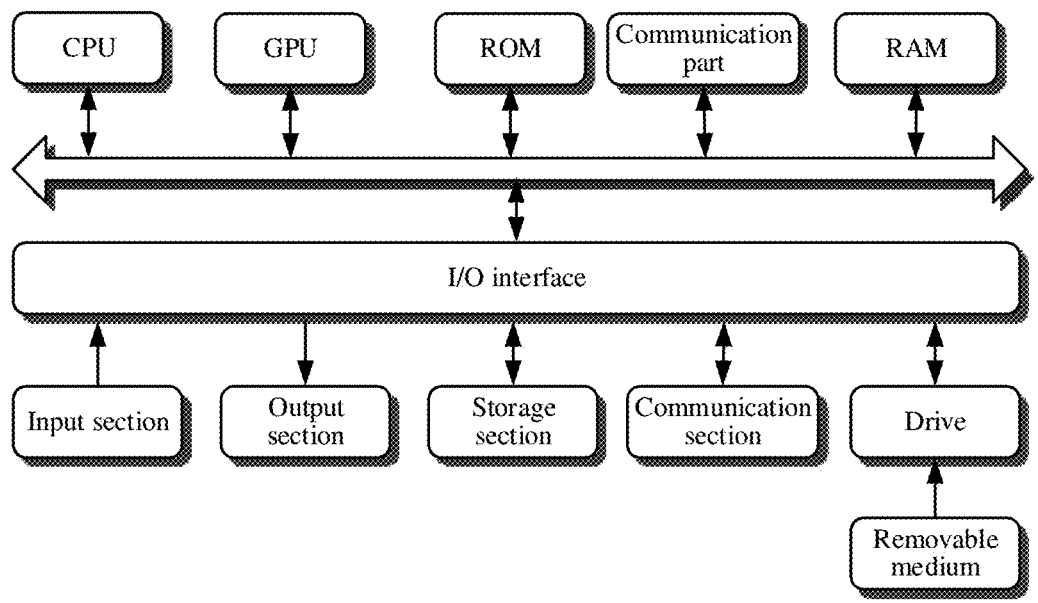
FIG. 18 is a schematic structural diagram of an application embodiment of an electronic device of the present disclosure.

FIG. 18 is a schematic structural diagram of an application embodiment of the electronic device of the present disclosure. Referring to FIG. 18 below, a schematic structural diagram of an electronic device suitable for implementing a terminal device or a server according to the embodiments of the present disclosure is shown. As shown in FIG. 18, the electronic device includes one or more processors, a communication part, and the like. The one or more processors are, for example, one or more Central Processing Units (CPUs), and/or one or more Graphic Processing Units (GPUs), and the like. The processor may perform various appropriate actions and processing according to executable instructions stored in a Read-Only Memory (ROM) or executable instructions loaded from a storage section to a Random Access Memory (RAM). The communication part may include, but is not limited to, a network card. The network card may include, but is not limited to, an Infiniband (IB) network card. The processor may communicate with the ROM and/or the RAM, to execute executable instructions. The processor is connected to the communication part through a bus, and communicates with other target devices through the communication part, thereby implementing corresponding operations of any method provided in the embodiments of the present disclosure, for example, obtaining a parameter value of a deformation effect parameter of at least one deformation region, establishing a correspondence between the at least one deformation region and predetermined at least one key point, and generating a deformation special effect program file package according to the at least one deformation region of which the parameter value is obtained and the correspondence, and for another example, obtaining a parameter value of a deformation effect parameter of a deformation region, and generating a special effect of a deformation effect on an image to be processed on the basis of a key point in the image to be processed and the parameter value of the deformation effect parameter of the deformation region.

In addition, the RAM may further store various programs and data required for operations of an apparatus. The CPU, the ROM, and the RAM are connected to each other through the bus. In the presence of the RAM, the ROM is an optional module. The RAM stores executable instructions, or writes the executable instructions into the ROM during running, where the executable instructions cause the processor to execute corresponding operations of any method of the present disclosure. An input/output (I/O) interface is also connected to the bus. The communication part may be integrated, or may be configured to have a plurality of sub-modules (for example, a plurality of IB network cards) connected to the bus.

The following components are connected to the I/O interface: an input section including a keyboard, a mouse and the like; an output section including a Cathode-Ray Tube (CRT), a Liquid Crystal Display (LCD), a speaker and the like; the storage section including a hard disk and the like; and a communication section of a network interface card including an LAN card, a modem and the like. The communication section performs communication processing through a network such as the Internet. A drive is also connected to the I/O interface according to requirements. A removable medium such as a magnetic disk, an optical disk, a magneto-optical disk, a semiconductor memory or the like is mounted on the drive according to requirements, so that a computer program read from the removable medium may be installed on the storage section according to requirements.

It should be noted that the architecture illustrated in FIG. 18 is merely an optional implementation mode. During specific practice, the number and types of the components in FIG. 18 may be selected, decreased, increased, or replaced according to actual requirements. Different functional components may be separated or integrated or the like. For example, the GPU and the CPU may be separated, or the GPU may be integrated on the CPU, and the communication part may be separated from or integrated on the CPU or the GPU or the like. These alternative implementations all fall within the scope of protection of the present disclosure.

Particularly, the process described above with reference to the flowchart according to the embodiments of the present disclosure may be implemented as a computer software program. For example, the embodiments of the present disclosure include a computer program product. The computer program product includes a computer program tangibly included in a machine-readable medium. The computer program includes a program code for performing a method shown in the flowchart. The program code may include instructions for correspondingly performing corresponding instructions of steps of the face anti-counterfeiting detection method provided in the embodiments of the present disclosure. In such an embodiment, the computer program is downloaded and installed from the network through the communication section, and/or is installed from the removable medium. When the computer program is executed by the CPU, the functions defined in the method according to the present disclosure are executed.

In addition, the embodiments of the present disclosure further provide a computer program including computer instructions, where when the computer instructions run in a processor of a device, the method for generating a deformation special effect program file package or the method for generating a deformation special effect according to any one of the embodiments of the present disclosure is implemented.

In addition, the embodiments of the present disclosure further provide a computer readable storage medium having a computer program stored thereon, where when the computer program is executed by a processor, the method for generating a deformation special effect program file package or the method for generating a deformation special effect according to any one of the embodiments of the present disclosure is implemented.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present disclosure may be implemented in many manners. For example, the methods and apparatuses in the present disclosure may be implemented with software, hardware, firmware, or any combination of software, hardware, and firmware. Unless otherwise specially stated, the foregoing sequences of steps of the methods are merely for description, and are not intended to limit the steps of the methods of the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A method for generating a deformation special effect program file package, comprising:
   obtaining parameter values of at least one deformation effect parameter for at least one deformation region;
   establishing a correspondence between the at least one deformation region and predetermined at least one key point; and
   generating a deformation special effect program file package according to the correspondence and the at least one deformation region for which the parameter values are obtained,
   wherein the at least one deformation effect parameter comprises a deformation effect control parameter, configured to control a deformation effect of a deformation region,
   wherein the deformation effect of the deformation region is controlled based on a deformation curve, and the deformation effect control parameter comprises parameters of the deformation curve; and
   the parameters of the deformation curve comprise at least one of a first control point parameter used for controlling a stretching direction and a stretching radius of the deformation effect, a second control point parameter used for controlling a transition smoothness of a middle region of the deformation region, or a third control point parameter used for controlling a transition smoothness of a boundary region of the deformation region.

2. The method according to claim 1, further comprising, before the obtaining parameter values of at least one deformation effect parameter for at least one deformation region, adding the at least one deformation region.

3. The method according to claim 1, wherein when the at least one deformation region comprises a plurality of deformation regions, the obtaining parameter values of at least one deformation effect parameter for at least one deformation region comprises at least one of:
    performing batch obtaining of parameter values of deformation effect parameters for the plurality of deformation regions;
    respectively obtaining parameter values of deformation effect parameters for at least some of the plurality of deformation regions; or
    obtaining, by duplication of one deformation region, another deformation region and parameter values of deformation effect parameters for the another deformation region.

4. The method according to claim 1, further comprising:
    receiving a deformation region adding instruction input through an interactive interface of an action bar, adding the at least one deformation region, generating a deformation effect parameter setting interface of the at least one deformation region, and displaying the deformation effect parameter setting interface of the at least one deformation region in the action bar;
    wherein the obtaining parameter values of at least one deformation effect parameter for at least one deformation region comprises: obtaining the parameter values of the at least one deformation effect parameter for the at least one deformation region through the deformation effect parameter setting interface.

5. The method according to claim 4, wherein the obtaining parameter values of at least one deformation effect parameter for at least one deformation region comprises:
    in response to receiving parameter values set for deformation effect parameters sent through an interactive interface in the deformation effect parameter setting interface of the at least one deformation region, taking the set parameter values as the parameter values of the at least one deformation effect parameter for the at least one deformation region; or
    in response to not receiving parameter values of the at least one deformation effect parameter sent through an interactive interface in the deformation effect parameter setting interface of the at least one deformation region, taking preset parameter values as the parameter values of the at least one deformation effect parameter for of the at least one deformation region.

6. The method according to claim 4, further comprising:
    receiving a deformation region deletion instruction input through the interactive interface of the action bar, and deleting the at least one deformation region and the parameter values of the at least one deformation effect parameter for of the at least one deformation region.

7. The method according to claim 1, wherein the obtaining parameter values of at least one deformation effect parameter for at least one deformation region comprises at least one of:
    obtaining at least one position parameter of the at least one deformation region by moving the at least one deformation region on a reference image;
    obtaining a range of the at least one deformation region by adjusting sizes of the at least one deformation region;
    obtaining the parameter values of the at least one deformation effect parameter for the at least one deformation region by adjusting the deformation curve for controlling the deformation effect; or
    obtaining the parameter values of the at least one deformation effect parameter for the at least one deformation region by receiving parameter values of at least one deformation effect control parameter.

8. The method according to claim 1, wherein the establishing a correspondence between the at least one deformation region and the predetermined at least one key point comprises at least one of:
    establishing a correspondence between position reference points of the at least one deformation region and the predetermined at least one key point; or
    establishing a correspondence between a position reference point of the deformation region and a central key point of a detection bounding box.

9. The method according to claim 1, wherein the at least one deformation effect parameter further comprises at least one of:
    a display parameter, configured to control whether to display the deformation effect of the deformation region;
    a trigger action parameter, configured to represent a trigger action for triggering the display of the deformation effect of the deformation region;
    a loop parameter, configured to represent a number of loop playbacks of the deformation effect;
    a trigger delay parameter, configured to represent a time by which the display of the deformation effect of the deformation region is delayed;
    a trigger stop parameter, configured to represent an action for stopping the display of the deformation effect of the deformation region;
    a display scale parameter, configured to represent a reference basis for change in a size of the deformation region;
    a position parameter, configured to represent a positional binding relationship between the deformation region and preset key points;
    a rotation center parameter, configured to represent a center point on which rotation of the deformation region is based;
    a deformation center parameter, configured to represent a center point of the deformation region;
    a mode transfer parameter, configured to transfer between center point offset modes of the deformation region; or
    a beautifying/make-up effect parameter, configured to represent a beautifying/make-up effect displayed at a preset part during display of the deformation effect,
    wherein a trigger action corresponding to a parameter value of the trigger action parameter comprises at least one of: a trigger without an action, an eye action, a head action, an eyebrow action, a hand action, a mouth action, or a shoulder action,
    wherein the center point offset modes of the deformation region comprise at least one of a simple center point stretching mode and/or a radial offset stretching mode.

10. The method according to claim 9, wherein the preset key points in the position parameter comprise two key points in predetermined key points, the two key points being located on a boundary of the deformation region and having a connection line passing through the center point of the deformation region; and the establishing a correspondence between the at least one deformation region and predetermined at least one key point comprises: establishing a correspondence between the deformation region and the two key points located on the boundary of the deformation region and having the connection line passing through the center point of the deformation region.

11. The method according to claim 1, wherein the stretching direction of the deformation effect comprises at least one of stretching outward from a center point of the deformation region or stretching inward from the center point of the deformation region.

12. The method according to claim 1, further comprising: displaying a reference image through a content display bar, the reference image comprising at least one reference part, at least one of receiving a reference point display instruction input through an interactive interface of an action bar and displaying at least one key point of the reference image; or receiving a reference point close instruction input through the interactive interface of the action bar, and displaying no key point of the reference image, wherein the reference image comprises at least one part of an image of a reference person, wherein the at least one part of the image of the reference person comprises at least one of the following images of the reference person: a complete image, a head image, a face image, a shoulder image, an arm image, a gesture image, a waist image, a leg image, or a foot image.

13. The method according to claim 12, further comprising:

displaying the deformation effect of the deformation region in the content display bar according to the parameter values of the at least one deformation effect parameters for the at least one deformation region; and updating a display position of the deformation region in the content display bar according to a position movement operation on the deformation region received through the content display bar, and updating a corresponding parameter value of a the deformation effect parameter for the deformation region.

14. The method according to claim 12, further comprising:

adjusting an occlusion relationship between two or more deformation regions according to an image layer parameter adjustment instruction for the two or more deformation regions received through the interactive interface of the action bar; and displaying a deformation effect corresponding to the two or more deformation regions according to the adjusted occlusion relationship and parameter values of deformation parameters corresponding to the two or more deformation regions.

15. The method according to claim 1, further comprising, before the generating a deformation special effect program file package, generating a special effect program file of the deformation region according to a preset deformation special effect program file and a parameter value of a deformation effect parameter of the deformation region, and displaying the special effect program file of the deformation region through a program file bar.

16. The method according to claim 1, further comprising: starting, according to a received start instruction, and displaying an operation interface, the operation interface comprising at least one of an action bar, a content display bar, or a program file bar, wherein the operation interface consists of a left region, a middle region, and a right region; and the displaying an operation interface comprises displaying the action bar on the left region of the operation interface, displaying the content display bar in the middle region of the operation interface, and displaying the program file bar on the right region of the operation interface.

17. A method for generating a deformation special effect, comprising:

importing a deformation special effect program file package;

obtaining a parameter value of a deformation effect parameter for a deformation region in the deformation special effect program file package; and generating a special effect of a deformation effect on an image to be processed based on at least one key point in the image to be processed and the parameter value of the deformation effect parameter for the deformation region, wherein the importing a deformation special effect program file package comprises:

reading the deformation special effect program file package into a memory by invoking a first interface function for reading the deformation region, and parsing the deformation special effect program file package to obtain a deformation special effect program file, the deformation special effect program file comprising the parameter value of the deformation effect parameter, wherein the obtaining a parameter value of a deformation effect parameter of a deformation region in the deformation special effect program file package comprises:

creating a sticker handle by using a second interface function for creating a sticker handle, and reading the parameter value of the deformation effect parameter for the deformation region in the deformation special effect program file, and storing the read parameter value to the sticker handle.

18. The method according to claim 17, wherein the parameter value of the deformation effect parameter for the deformation region comprises a correspondence between the deformation region and predetermined at least one key point.

19. The method according to claim 18, wherein the method further comprises: obtaining, according to the parameter value of the deformation effect parameter for the deformation region in the deformation special effect program file in the sticker handle, a position of the deformation region displayed in the image to be processed; and when the image to be processed is an image in a video, obtaining a video frame number of the deformation region displayed in the video where the image is located, and previously reading images corresponding to a number of frames of the video frames from the video.

20. The method according to claim 19, wherein the generating a special effect of a deformation effect on an image to be processed based on at least one key point in the image to be processed and the parameter value of the deformation effect parameter for the deformation region comprises:

reading, from the sticker handle, the deformation region to be displayed on the image to be processed by invoking a third interface function for rendering a deformation region;

determining, according to the at least one key point in the image to be processed and the parameter value of the deformation effect parameter for the deformation region to be displayed, a display position of the deformation region on the image to be processed; and displaying, according to the display position of the deformation region on the image to be processed, the deformation region at the display position on the image to be processed.

21. The method according to claim 20, wherein the deformation effect parameter comprises a trigger action parameter, the trigger action parameter being configured to represent a trigger action for triggering display of the deformation effect;

the method further comprises detecting whether a trigger action corresponding to a the parameter value of the trigger action parameter is present in the image to be processed; and the generating a special effect of a deformation effect on an image to be processed based on at least one key point in the image to be processed and the parameter value of the deformation effect parameter for the deformation region comprises:

in response to detecting that the trigger action corresponding to the parameter value of the trigger action parameter is present in the image to be processed, generating the special effect of the deformation effect on the image to be processed based on the at least one key point in the image to be processed and the parameter value of the deformation effect parameter for the deformation region.

22. The method according to claim 17, further comprising:

performing, for the image to be processed, detection on key points involved in a correspondence between the deformation region and predetermined at least one key point through a neural network, and outputting a key point detection result, wherein the key point detection result comprises at least one of: positions of the key points involved in the correspondence in the image to be processed, or a preset serial number of the key points involved in the correspondence.

23. The method according to claim 17, wherein the deformation effect parameter comprises a beautifying/make-up effect parameter, the beautifying/make-up effect parameter being configured to represent a beautifying/make-up effect displayed at a preset part during displaying the deformation effect; and the method further comprises: displaying, based on the at least one key point in the image to be processed and the parameter value of the deformation effect parameter of the deformation region, the beautifying/make-up effect on the image to be processed according to the beautifying/make-up effect parameter when generating the special effect of the deformation effect on the image to be processed.

24. An apparatus for generating a deformation special effect program file package, comprising:

a processor and a memory, configured to store instructions executable by the processor, wherein the processor is configured to:

obtain parameter values of at least one deformation effect parameter for at least one deformation region;

establish a correspondence between the at least one deformation region and predetermined at least one key point; and generate a deformation special effect program file package according to the correspondence and the at least one deformation region for which the parameter values are obtained, wherein the at least one deformation effect parameter comprises a deformation effect control parameter, configured to control a deformation effect of a deformation region, wherein the deformation effect of the deformation region is controlled based on a deformation curve, and the deformation effect control parameter comprises parameters of the deformation curve; and the parameters of the deformation curve comprise at least one of a first control point parameter used for controlling a stretching direction and a stretching radius of the deformation effect, a second control point parameter used for controlling a transition smoothness of a middle region of the deformation region, or a third control point parameter used for controlling a transition smoothness of a boundary region of the deformation region, or wherein the processor is configured to:

import a deformation special effect program file package;

obtain a parameter value of a deformation effect parameter for a deformation region in the deformation special effect program file package; and generate a special effect of a deformation effect on an image to be processed based on at least one key point in the image to be processed and the parameter value of the deformation effect parameter for the deformation region, wherein the operation of importing a deformation special effect program file package comprises:

reading the deformation special effect program file package into a memory by invoking a first interface function for reading the deformation region, and parsing the deformation special effect program file package to obtain a deformation special effect program file, the deformation special effect program file comprising the parameter value of the deformation effect parameter, wherein the operation of obtaining a parameter value of a deformation effect parameter of a deformation region in the deformation special effect program file package comprises:

creating a sticker handle by using a second interface function for creating a sticker handle, and reading the parameter value of the deformation effect parameter for the deformation region in the deformation special effect program file, and storing the read parameter value to the sticker handle.

* * * * *